US012693108B2

(12) United States Patent
Redgewell et al.

(10) Patent No.: US 12,693,108 B2
(45) Date of Patent: Jul. 28, 2026

(54) METROLOGY SYSTEM

(71) Applicant: LEICA GEOSYSTEMS AG,
Heerbrugg (CH)

(72) Inventors: Duncan Redgewell, Nieder Erlinsbach
(CH); Markus Steiner, Gränichen
(CH); Thomas Lüthi, Aarau (CH);
Veroljub Maksimovic, Biberist (CH);
Raimund Loser, Bad Säckingen (DE)

(73) Assignee: LEICA GEOSYSTEMS AG,
Heerbrugg (CH)

( * ) Notice: Subject to any disclaimer, the term of this
patent is extended or adjusted under 35
U.S.C. 154(b) by 395 days.

(21) Appl. No.: 17/767,421

(22) PCT Filed: Oct. 11, 2019

(86) PCT No.: PCT/EP2019/077599
§ 371 (c)(1),
(2) Date: Apr. 7, 2022

(87) PCT Pub. No.: WO2021/069079
PCT Pub. Date: Apr. 15, 2021

(65) Prior Publication Data
US 2023/0099779 A1       Mar. 30, 2023

(51) Int. Cl.
*G01B 11/00* (2006.01)
*G01B 5/008* (2006.01)
*G01C 11/00* (2006.01)
*G01S 7/00* (2006.01)
(Continued)

(52) U.S. Cl.
CPC ............ *G01B 11/005* (2013.01); *G01B 5/008*
(2013.01); *G01C 11/00* (2013.01); *G01S 7/003*
(2013.01); *G01S 7/4808* (2013.01); *G01S*
*7/497* (2013.01)

(58) Field of Classification Search
CPC ...... G01B 11/005; G01B 5/008; G01C 11/00;
G01S 7/003; G01S 7/4808; G01S 7/497
See application file for complete search history.

(56) References Cited

U.S. PATENT DOCUMENTS

| | | | |
|---|---|---|---|
| 9,683,837 B2 * | 6/2017 | Siercks | ................. G01B 11/25 |
| 9,897,442 B2 | 2/2018 | Pettersson et al. | |
| 10,030,972 B2 * | 7/2018 | Iseli | .................... G01B 21/042 |

(Continued)

FOREIGN PATENT DOCUMENTS

| | | |
|---|---|---|
| CN | 1818545 A | 8/2006 |
| CN | 101033958 A | 9/2007 |

(Continued)

OTHER PUBLICATIONS

CN Office Action dated Mar. 27, 2024 as received in Application
No. 201980101184.1.

(Continued)

*Primary Examiner* — Tarifur R Chowdhury
*Assistant Examiner* — Joshua M Carlson
(74) *Attorney, Agent, or Firm* — Maschoff Brennan

(57) ABSTRACT

The invention relates generally to a metrology system and
coordinate measuring devices to be used within the frame-
work of a smart factory environment, which has a defined
arrangement of different metrology devices, configured such
that coordinate measuring data generated by different
metrology devices are referencable to a common coordinate
system.

9 Claims, 18 Drawing Sheets

(51) Int. Cl.
  *G01S 7/48* (2006.01)
  *G01S 7/497* (2006.01)

(56) References Cited

U.S. PATENT DOCUMENTS

| | | | | |
|---|---|---|---|---|
| 10,054,422 | B2* | 8/2018 | Böckem | G01B 21/042 |
| 10,337,865 | B2 | 7/2019 | Green et al. | |
| 11,035,659 | B2* | 6/2021 | Ihlenfeldt | G01B 11/005 |
| 11,656,357 | B2* | 5/2023 | Pivac | G01B 9/02029 |
| | | | | 356/614 |
| 2003/0227616 | A1 | 12/2003 | Bridges | |
| 2014/0028805 | A1* | 1/2014 | Tohme | G01B 11/2518 |
| | | | | 348/47 |
| 2014/0046589 | A1* | 2/2014 | Metzler | G05D 1/0094 |
| | | | | 356/3.09 |
| 2014/0376768 | A1 | 12/2014 | Troy et al. | |
| 2015/0009493 | A1 | 1/2015 | Kwiatkowski et al. | |
| 2015/0043007 | A1 | 2/2015 | Kwiatkowski et al. | |
| 2015/0354942 | A1* | 12/2015 | Bridges | G01B 11/14 |
| | | | | 33/503 |
| 2016/0252619 | A1 | 9/2016 | Markendorf et al. | |
| 2020/0132450 | A1* | 4/2020 | Grzesiak | G01B 5/008 |

FOREIGN PATENT DOCUMENTS

| | | |
|---|---|---|
| CN | 102947670 A | 2/2013 |
| CN | 105606077 A | 5/2016 |
| CN | 109655040 A | 4/2019 |

OTHER PUBLICATIONS

Hongfang, C. et al., "High-Precision Laser Tracking Measurement Method and Experimental Study," Chinese Journal of Lasers, vol. 45, Issue 1 (Jan. 2018).
CN Decision to Grant Dated Dec. 23, 2024 as received in Application No. 201980101184.1.

* cited by examiner

METROLOGY SYSTEM

FIELD OF THE INVENTION

The invention relates generally to a metrology system and coordinate measuring devices to be used within the framework of a smart factory environment.

BACKGROUND

In metrology it is a general object to determine geometrical properties such as coordinates, distances, and orientations of one or more target objects relative to a surveying device, wherein in most instances those properties have to be determined with respect to a known reference system, e.g. defined by one or more known reference points.

Methods and systems for measuring target coordinates are used in many applications, e.g. very precise measurements in geodesic applications, measurement problems in the field of building installation, or for controlling industrial processes, wherein many structural features of the used measuring devices, e.g. total stations and industrial laser trackers, are increasingly converging today.

It is an object of the invention to provide improved workflows and improved systems to determine geometrical properties of an object in a smart factory environment.

SUMMARY

These objects are achieved by the realization of at least part of the characterizing features of the independent claims. Features which further develop the invention in an alternative or advantageous manner can be found in some of the other features of the independent claims and in the dependent claims.

One aspect of the invention relates to a metrology system with at least a first and a second coordinate measuring device in each case configured to automatically track a movable accessory device and to generate coordinate measuring data for determining a position, and particularly an orientation, of the movable accessory device. The first and second coordinate measuring device are arranged in a fixed positional relationship such that the coordinate measuring data generated by the first and the second coordinate measuring device are referenceable to a common coordinate system, wherein the first and the second coordinate measuring device are configured to communicate to each other, particularly by device-to-device communication and/or communication over a central computer. Furthermore, the system comprises the movable accessory device, configured for scanning or probing of an object, particularly at least one of tactile scanning, laser based scanning, and camera based scanning, and/or for carrying out an intervention on the object, particularly for manufacturing and/or marking the object.

According to this aspect, the first coordinate measuring device is configured to track the movable accessory device and to generate coordinate measuring data when the movable accessory device is located within a first measuring area, and the second coordinate measuring device is configured to track the movable accessory device and to generate coordinate measuring data when the movable accessory device is located within a second measuring area, wherein the system is configured to send out a position signal while the movable accessory device is located within the first measuring area, the position signal providing positional information regarding the position of the movable accessory device, and the second coordinate measuring device is configured to initiate tracking the movable accessory device based on the position signal.

In one embodiment, the first measuring area comprises a transition area interfacing with the second measuring area, wherein the system, particularly the first coordinate measuring device, is configured to send out a trigger signal when the movable accessory device is located within the transition area, and the second coordinate measuring device is configured to initiate the tracking based on the trigger signal.

In a further embodiment, the system is configured to derive an estimated motion path of the movable accessory device, and to send the trigger signal based on the derived estimated motion path. For example, the system is configured to derive a current velocity and/or acceleration parameter of the movable accessory device and/or to derive a current position parameter providing a current position of the moveable accessory device within the transition area, e.g. indicative of a distance to a boundary of the transition area, wherein the trigger signal is sent based on the derived current velocity and/or acceleration parameter and/or based on the current position parameter.

In a further embodiment, the system comprises a communication network for exchanging the position signal and/or the trigger signal, wherein the communication network is based on at least one of a wired connection, WLAN technology, Bluetooth beacon technology, and radio frequency technology.

For example, the movable accessory device is at least one of a probing or scanning device configured to approach the object and to carry out at least one of a tactile, a laser based, and a camera based coordinate measurement, a marking device configured to mark the object, a tool and/or manufacturing instrument, and another coordinate measuring device, e.g. embodied as a laser tracker. In particular, the movable accessory device may have a mounting interface which is specifically foreseen for mounting the movable accessory device to an automated guided vehicle or an articulated arm robot.

In a further embodiment, the system is configured to determine a quality parameter for at least one of a coordinate measuring accuracy and a tracking accuracy provided by the coordinate measuring data of the first coordinate measuring device, and the system is configured to send the position signal and/or the trigger signal based on the quality parameter, particularly based on a pre-defined nominal coordinate measuring accuracy to be ensured.

In a further embodiment, the system is configured to determine a potentially upcoming measurement blind spot of the first coordinate measuring device being defined by at least one of a reduced coordinate measuring accuracy by the first coordinate measuring device depending on a relative position of the movable accessory device with respect to the first coordinate measuring device, e.g. wherein generation of first coordinate measuring data is disturbed, particularly intermitted, by an interfering object, and a reduced tracking accuracy by the first coordinate measuring device depending on a relative position of the movable accessory device with respect to the first coordinate measuring device, particularly wherein a tracking signal for tracking the movable accessory device is disturbed, particularly intermitted, by an interfering object. Therefore, the system may be configured to send the position and/or the trigger signal based on the potentially upcoming measurement blind spot.

In a further embodiment, the system comprises a camera arrangement configured to generate image data, which are referenceable to the common coordinate system, e.g. wherein the camera arrangement comprises a camera arranged in a fixed positional relationship with respect to the first coordinate measuring device. Furthermore, the system comprises a recognizer configured to recognize the interfering object within an image of the image data, particularly based on a computer vision algorithm. For example, the camera arrangement comprises an external camera separated from the first coordinate measuring device and/or a camera integrated in the first coordinate measuring device.

In a further embodiment, the camera arrangement is embodied as a panoramic camera arrangement configured to provide for image data which cover, in at least one spatial direction, a visual field of at least 120°, particularly at least 180°, more particularly 360°. By way of example, the camera arrangement comprises a wide-angle camera configured to provide single images having a visual field of at least 120°, particularly at least 180°, more particularly 360°, and/or the camera arrangement comprises multiple cameras and is configured to generate from image data of the multiple cameras a panoramic image, namely wherein individual images of the multiple cameras are stitched together to form an image having a wider field of view than the individual images.

A further aspect of the invention, taken separately or in combination with the other aspects of the invention, relates to a coordinate measuring device configured to automatically track a movable accessory device and to generate coordinate measuring data for determining a position, and particularly an orientation, of the movable accessory device. The coordinate measuring device is configured to be automatically movable and the coordinate measuring device comprises a measuring aid configured in such a way and arranged in a fixed relationship with the coordinate measuring device such that a movement and orientation of the measuring aid is indicative of a movement and orientation of the coordinate measuring device. The measuring aid has an arrangement of markings disposed in a defined spatial relationship and forming a reflective and/or self-illuminated pattern, and a retroreflector, in particular wherein the retroreflector is arranged in a fixed spatial relationship relative to the arrangement of markings, more particularly in a central area of the pattern formed by the arrangement of markings.

In one embodiment, the coordinate measuring device has a mounting interface which is specifically foreseen for mounting the coordinate measuring device to an automated guided vehicle or an articulated arm robot.

In a further embodiment, the coordinate measuring device comprises multiple measuring aids, each of the multiple measuring aids having an arrangement of markings disposed in a defined spatial relationship and forming a reflective and/or self-illuminated pattern, and having a retroreflector, in particular wherein the retroreflector is arranged in a fixed spatial relationship relative to the arrangement of markings, more particularly in a central area of the pattern formed by the arrangement of markings. For example, the coordinate measuring device comprises exactly two such measuring aids arranged at two different faces of the coordinate measuring device. In particular, the coordinate measuring device may comprise exactly four such measuring aids arranged at four different faces of the coordinate measuring device.

In a further embodiment, the coordinate measuring device, e.g. the measuring aid, comprises an inertial measuring unit and/or a visual inertial system configured to generate posture data indicative of a change in position and/or change of orientation of the coordinate measuring device, and a transmitter for providing the posture data to an external referencing device for determining the position and orientation of the measuring aid.

In a further embodiment, the coordinate measuring device is configured to automatically move to a re-location position in order to avoid a measurement blind spot, which is defined by at least one of a reduced coordinate measuring accuracy by the coordinate measuring device depending on a relative position of the movable accessory device with respect to the coordinate measuring device, e.g. wherein generation of coordinate measuring data is disturbed, e.g. intermitted, by an interfering object, and a reduced tracking accuracy by the coordinate measuring device depending on a relative position of the movable accessory device with respect to the coordinate measuring device, e.g. wherein a tracking signal for tracking the movable accessory device is disturbed, e.g. intermitted, by an interfering object. By way of example, the coordinate measuring device is configured to determine a potentially upcoming measurement blind spot and to determine an associated re-location position, or the coordinate measuring device is configured to receive a movement command comprising the re-location position.

In a further embodiment, the coordinate measuring device comprises a camera arrangement configured to generate image data, and a recognizer configured to recognize the interfering object within an image of the image data. By way of example, the coordinate measuring device is configured to access a database comprising recognition indicia indicative of the appearance of a plurality of measurement and/or manufacturing devices to be used within a given measuring and/or manufacturing environment, wherein the recognition indicia provide for recognition of the devices by image processing of the generated image data. Furthermore, the coordinate measuring device may be configured to carry out an object search functionality, e.g. automatically at fixed intervals or manually triggered by a user, wherein the object search functionality comprises automatic generation of image data and recognition of devices within the automatically generated image data, and determination and storage of positional data, e.g. azimuthal position parameters, of the devices recognized by the recognition relative to the position of the coordinate measuring device. Thus, the coordinate measuring device can be configured to take into account the positional data for determining the potentially upcoming measurement blind spot.

In a further embodiment, the camera arrangement is embodied as a panoramic camera arrangement configured to provide for image data which cover, in at least one spatial direction, a visual field of at least 120°, particularly at least 180°, more particularly 360°. For example, the camera arrangement comprises a wide-angle camera configured to provide single images having a visual field of at least 120°, particularly at least 180°, more particularly 360°, and/or the camera arrangement comprises multiple cameras and is configured to generate from image data of the multiple cameras a panoramic image, namely wherein individual images of the multiple cameras are stitched together to form an image having a wider field of view than the individual images.

In a further embodiment, the coordinate measuring device has a communication interface configured for communication with an external referencing device for determining the position and orientation of the measuring aid, particularly a laser tracker. Furthermore, the coordinate measuring device is configured to send out a movement signal indicating a re-location movement of the coordinate measuring device and comprising information on the current position of the coordinate measuring device and/or on the re-location position.

A further aspect of the invention, taken separately or in combination with the other aspects of the invention, relates to a metrology system with a coordinate measuring device as described above, configured to automatically track a movable accessory device and to generate coordinate measuring data for determining a position, and particularly an orientation, of the movable accessory device. The system further comprises the movable accessory device, a camera arrangement configured to generate image data which are referenceable to a local coordinate system of the coordinate measuring device, and a recognizer configured to recognize an interfering object within an image of the image data, the interfering object disturbing, e.g. intermitting, generation of coordinate measuring data of the movable accessory device by the coordinate measuring device and/or a tracking signal of the coordinate measuring device for tracking the movable accessory device. The system is configured to determine a potentially upcoming measurement blind spot of the coordinate measuring device and to automatically move the coordinate measuring device to a re-location position in order to avoid the measurement blind spot, which is defined by at least one of a reduced coordinate measuring accuracy by the coordinate measuring device depending on a relative position of the movable accessory device and/or the coordinate measuring device with respect to the interfering object, and a reduced tracking accuracy by the coordinate measuring device depending on a relative position of the movable accessory device and/or the coordinate measuring device with respect to the interfering object.

For example, the recognizer is configured to access a database comprising recognition indicia indicative of the appearance of a plurality of measurement and/or manufacturing devices to be used within the system, wherein the recognition indicia provide for recognition of the devices by image processing of the generated image data. Furthermore, the system may be configured to carry out an object search functionality, e.g. automatically at fixed intervals or manually triggered by a user, wherein the object search functionality comprises automatic generation of image data and recognition of devices within the automatically generated image data, and determination and storage of positional data, e.g. azimuthal position parameters, of the devices recognized by the recognition relative to the position of the coordinate measuring device. Thus, the system may then be configured to take into account the positional data for determining the potentially upcoming measurement blind spot.

A further aspect of the invention, taken separately or in combination with the other aspects of the invention, relates to a metrology system with a coordinate measuring device with a measuring aid, e.g. a measuring aid as described above. In the following, this coordinate measuring device is referred to as the movable tracker. Furthermore, the system comprises a referencing device, particularly a total station or a laser tracker, more particularly a coordinate measuring device as described above, configured to generate referencing data indicative of the position and orientation of the measuring aid of the movable tracker. The system has a communication network configured to provide communication between the movable tracker and the referencing device, wherein the system is configured to send a movement signal indicating a re-location movement of the movable tracker over the communication network. For example, the movement signal comprises information on the current position of the movable tracker and/or on a target position of the movable tracker. Here, the referencing device is configured to generate the referencing data based on the movement signal, particularly wherein the system comprises a data processing network configured to receive coordinate measuring data of the movable tracker and referencing data of the referencing device, and to merge the coordinate measuring data and the referencing data into a common coordinate system.

In one embodiment, the moveable tracker comprises an inertial measuring unit and/or a visual inertial system configured to generate posture data indicative of a change in position and/or change of orientation of the movable tracker, wherein the referencing device is configured to generate the referencing data based on the posture data. For example, the moveable tracker is configured to provide feature identification data for identifying features used by the visual inertial system to the referencing device, particularly together with image data of the visual inertial system, wherein the referencing device is configured to determine the position and/or orientation of the movable tracker based on the feature identification data.

In a further embodiment, the system comprises a further coordinate measuring device, e.g. a coordinate measuring device according to one of the above described embodiments, wherein this coordinate measuring device is embodied as a laser tracker and in the following called relay laser tracker. The relay laser tracker is configured to generate first intermediate data indicative of the position and orientation of the measuring aid of the movable tracker with respect to the relay laser tracker. Furthermore, the referencing device is configured to generate second intermediate data indicative of the position and orientation of the measuring aid of the relay laser tracker with respect to the referencing device, wherein the relay laser tracker and the referencing device are configured that the first and second intermediate data are provided to the data processing network.

A further aspect of the invention, taken separately or in combination with the other aspects of the invention, relates to a metrology system with a laser tracker having an opto-electronic distance meter, which is configured to emit a distance measurement beam towards a cooperative target of a moveable accessory device in the direction of an aiming axis and to determine distance measurement data based on at least a part of the distance measurement beam returning from the cooperative target. The laser tracker further has an angle determining unit configured to provide angle determination data for determining the pointing direction of the aiming axis, and a tracking unit, wherein the tracking unit is configured to receive over a tracking channel a tracking signal which is indicative of a change in angular location of the cooperative target, to determine the change in angular location of the cooperative target based on the tracking signal, and to generate primary control data for adjusting the alignment of the aiming axis based on the determined change in angular location. The system further comprises the movable accessory device configured for scanning or probing of an object, particularly at least one of tactile scanning, laser based scanning, and camera based scanning, and/or for carrying out an intervention on the object, particularly for manufacturing and/or marking the object. In addition, the system comprises an auxiliary position determination unit being separate from the laser tracker, wherein the auxiliary position determination unit is configured to communicate with the laser tracker, particularly in a wired or wireless fashion, and to generate auxiliary measuring data for determining a position, and particularly an orientation, of the movable accessory device. Here, the laser tracker and the auxiliary position determination unit are configured that the auxiliary measuring data are referenceable to a local coordinate system of the laser tracker, e.g. wherein the laser tracker and the auxiliary position determination unit are arranged in a fixed positional relationship with respect to each other. Furthermore, the laser tracker is configured to determine a quality parameter providing at least one of a coordinate measuring accuracy provided by the distance measurement data and the angle determination data, and a tracking accuracy provided by the tracking signal, wherein the laser tracker and the auxiliary position determination unit are configured that auxiliary control data for adjusting the alignment of the aiming axis of the laser tracker are generated based on the quality parameter and the auxiliary measuring data.

In one embodiment, the laser tracker is configured to send a trigger signal to the auxiliary position determination unit based on the quality parameter, e.g. in case the quality parameter indicates that a pre-defined nominal coordinate measuring accuracy falls below a quality threshold, and the auxiliary position determination unit is configured to start generating the auxiliary control data based on the trigger signal.

By way of example, the system comprises a multitude of auxiliary measuring devices, each of the multitude of auxiliary measuring devices being configured to generate auxiliary measuring data which are referenceable to the local coordinate system of the laser tracker, and the laser tracker is configured to send the trigger signal as a broadcast signal.

In a further embodiment, the laser tracker and the auxiliary position determination unit are configured that a position of the movable accessory device is determined based on the distance measurement data, the angle determination data, and the auxiliary measuring data.

A further aspect of the invention, taken separately or in combination with the other aspects of the invention, relates to a metrology system with a plurality of movable accessory devices, each movable accessory device being configured for scanning or probing of an object, e.g. at least one of tactile scanning, laser based scanning, and camera based scanning, and/or for carrying out an intervention on the object, e.g. for manufacturing and/or marking the object. The system also has a plurality of coordinate measuring devices, each coordinate measuring device being configured to automatically track one of the movable accessory devices and to generate coordinate measuring data for determining a position, and particularly an orientation, of this movable accessory device. An accessory device database comprises identification data providing for identification of each of the accessory devices, wherein the system comprises an examination arrangement configured for generating examination data of an accessory device, and an evaluator configured to provide classification of one of the movable accessory devices based on the identification data and the examination data. Here, the system is configured to carry out, particularly automatically, a presetting of the plurality of coordinate measuring devices based on the classification.

For example, the presetting comprises a selection of a subgroup of devices out of the plurality of movable accessory devices and/or the plurality of coordinate measuring devices, e.g. wherein the selection takes into account a current availability of the devices and/or pre-defined combination parameters providing allowed combinations for combining the devices.

In one embodiment, the presetting comprises carrying out a calibration procedure for calibrating the devices within the subgroup of devices with respect to each other, wherein the calibration procedure comprises setting of a relative addition constant of a recognized accessory device, e.g. a recognized prism, and/or provides for referencing measurement data of at least part of the subgroup of devices within a common coordinate system.

In a further embodiment, the examination arrangement comprises a camera configured to generate camera data, and the classification is based on an image processing and feature extraction algorithm. For example, for each movable accessory device template image data are stored in an image database, and the classification is based on an image processing and feature extraction algorithm programmed for finding matching features in both the camera data and in the template image data.

In a further embodiment, at least one of the movable accessory devices has an electronic device tag, e.g. an RFID tag, configured to provide device identification with respect to the at least one movable accessory device, wherein the examination arrangement comprises a device tag detector, e.g. a radio frequency receiver, configured to communicate with the electronic device tag to query the device identification, and wherein the system is configured that classification is based on the device identification.

In a further embodiment, the system is configured that the presetting is based on a categorisation of a user operating the system, e.g. wherein the selection is dependent on the categorisation. For example, the system comprises a set of electronic user tags, e.g. RFID tags, specifically foreseen to be carried by a group of users, wherein the set of electronic user tags is configured to provide user identification to discriminate between at least two different user categories. Furthermore, the system comprises a user tag detector, e.g. a radio frequency receiver, configured to communicate with the electronic user tag to query the user identification, wherein the system is configured that the categorisation is based on the user identification.

In a further embodiment, the system comprises an instructions database with operating instructions for at least part of the plurality of movable accessory devices and/or at least part of the plurality of coordinate measuring devices, wherein the system further comprises a user aid device configured to provide visual and/or acoustic operating instructions to a user based on the classification, and, for example, as a function of the categorisation.

By way of example, the user aid device is embodied as one of a personal computer or a laptop, a tablet computer, a smart phone, video glasses, a speaker, a laser projector, and one or more contact lens projectors. In particular, the user aid device may be configured to work with augmented reality technology.

The plurality of coordinate measuring devices may comprise one of a laser tracker, a camera system, an articulated arm robot, a tachymeter, a theodolite, total station, a projection scanner, e.g. a fringe projection scanner, a triangulation scanner, a laser scanner, a time of flight measuring unit, and a laser radar unit.

In a further embodiment, the plurality of moveable accessory devices comprises one of a probing or scanning device configured to approach the object and to carry out at least one of a tactile, a laser based, and a camera based coordinate measurement, a marking device configured to mark the object, a tool and/or manufacturing instrument, a range imaging camera, a stereo-imaging camera, an articulated arm robot, a white light sensor, a laser scanner, and a time of flight measuring unit.

A further aspect of the invention, taken separately or in combination with the other aspects of the invention, relates to a metrology system with a plurality of system devices, the plurality of system devices comprising at least a coordinate measuring device configured to automatically track a movable accessory device and to generate coordinate measuring data for determining a position, and particularly an orientation, of the movable accessory device. The system further comprises the movable accessory device configured for scanning or probing of an object, e.g. at least one of tactile scanning, laser based scanning, and camera based scanning, and/or for carrying out an intervention on the object, e.g. for manufacturing and/or marking the object. According to this aspect, the system further comprises an areal database comprising identification data for identifying different areas on the object, an examination arrangement configured for generating examination data of the object, and an evaluator configured to provide identification of at least one of the measurement areas based on the identification data and the examination data. Furthermore, the system has a user aid device configured to provide a measurement instruction to a user, wherein the system is configured to determine the measurement instruction based on the identification of the at least one measurement area, and to provide the measurement instruction over the user aid device, the measurement instruction including at least an instruction to use a specific system device from the plurality of system devices.

For example, the specific system device is selected by taking into account a current availability of the system devices and/or pre-defined combination parameters providing allowed combinations for combining different system devices.

In one embodiment, the system is configured to automatically carry out a calibration procedure for calibrating the specific system device within a subgroup of the system devices with respect to each other, wherein the calibration procedure provides for referencing measurement data of the specific system device within a common coordinate system of the subgroup of the system devices.

In a further embodiment, the examination arrangement comprises a camera configured to generate camera data, particularly a range imaging camera or stereo imaging device configured to generate 3D-image data, and the identification is based on an image processing and feature extraction algorithm, e.g. wherein the identification parameters are based on a CAD model of the object.

For example, template image data for different measurement areas of the object are stored in an image database, and the identification is based on an image processing and feature extraction algorithm programmed for finding matching features in both the camera data and in the template image data.

In a further embodiment, the system is configured that the measurement instruction is provided as a function of a categorization of a user operating the system. For example, the system comprises a set of electronic user tags, e.g. RFID tags, specifically foreseen to be carried by a set of users, wherein the set of electronic user tags is configured to provide user identification to discriminate between at least two different users and/or two different user categories, wherein the system further comprises a user tag detector, e.g. a radio frequency receiver, configured to communicate with the electronic user tag to query the user identification. Therefore, the system may be configured that the categorisation is based on the user identification.

By way of example, the measurement instruction comprises at least one of instructions for setting one of the movable accessory devices, instructions for setting one of the coordinate measuring devices, instructions for using a specific movable accessory device in conjunction with at least one of the coordinate measuring devices, and cautionary information, e.g. with regard to user safety and measurement accuracy.

In a further embodiment, the system is configured that the measurement instruction is provided based on a settable nominal measurement parameter, e.g. at least one of a nominal point density of the coordinate measuring data, a nominal accuracy level of the coordinate measuring data, and a nominal measurement time window.

For example, the user aid device is embodied as one of a personal computer or a laptop, a tablet computer, a smart phone, video glasses, a speaker, a laser projector, and one or more contact lens projectors, e.g. wherein the user aid device is configured to work with augmented reality technology.

The plurality of system devices may comprise a plurality of coordinate measuring devices, wherein the plurality of coordinate measuring devices comprises one of a laser tracker, a camera system, an articulated arm robot, a tachymeter, a theodolite, a total station, a projection scanner, e.g. a fringe projection scanner, a triangulation scanner, a stereo-imaging camera, an articulated arm robot, a white light sensor, a laser scanner, a time of flight measuring unit, and a laser radar unit.

In a further embodiment, the plurality of system devices comprises a plurality of movable accessory devices, wherein the plurality of movable accessory devices comprises one of a probing or scanning device configured to approach the object and to carry out at least one of a tactile, a laser based, and a camera based coordinate measurement, a marking device configured to mark the object, a tool and/or manufacturing instrument, a range imaging camera, a stereo-imaging camera, an articulated arm robot, a white light sensor, a laser scanner, and a time of flight measuring unit.

A further aspect of the invention, taken separately or in combination with the other aspects of the invention, relates to a computer program product comprising program code which is stored on a machine-readable medium or is embodied by an electromagnetic wave comprising a program code segment, and has computer-executable instructions for performing, e.g. when run on a computing device of a coordinate measuring device or system as described above, at least the following steps:

reading input data defining a measurement task to be carried out by at least part of a plurality of system devices being part of a fixed measurement environment having a plurality of distributed measurement areas, wherein the plurality of system devices comprises at least a coordinate measuring device configured to automatically track a movable accessory device and to generate coordinate measuring data for determining a position, and particularly an orientation, of the movable accessory device, and the movable accessory device configured for scanning or probing of an object, e.g. at least one of tactile scanning, laser based scanning, and camera based scanning, and/or for carrying out an intervention on the object, e.g. for manufacturing and/or marking the object;

reading status data of the plurality of system devices;

determining, based on the status data, a subgroup of the system devices to carry out the measurement task; and providing an output indicating at least part of the subgroup of system devices to carry out the measurement task.

In one embodiment, the status data comprise at least one of positional data of a current location of a system device, a power status of a system device, a power consumption rate of a system device, a measurement range of a system device, indication of a measurement accuracy of a system device, and indication of an occupancy time of a system device.

For example, the computer program product is configured to initialize a broadcast or multicast signal configured to request a response signal comprising the status data.

In a further embodiment, the computer program product is configured to determine, based on the status data, a free movement area for interacting with the subgroup of system devices in order to carry out the measurement task, wherein the free movement area is configured that the group of system devices or any other object inside the free movement area are arbitrarily moveable without disturbing a measurement task carried out by any of the remainder of the system devices, and to provide as part of the output positional data indicating the extent and location of the free movement area.

For example, the computer program product is configured to determine a restriction area based on the status data, and to provide as part of the output positional data indicating the extent and location of the restriction area.

A further aspect of the invention, taken separately or in combination with the other aspects of the invention, relates to a metrology system with a plurality of system devices being part of a fixed measurement environment having a plurality of distributed measurement areas. The plurality of system devices comprises at least a coordinate measuring device configured to automatically track a movable accessory device and to generate coordinate measuring data for determining a position, and particularly an orientation, of the movable accessory device. Furthermore, the plurality of system devices comprises the movable accessory device configured for scanning or probing of an object, e.g. at least one of tactile scanning, laser based scanning, and camera based scanning, and/or for carrying out an intervention on the object, e.g. for manufacturing and/or marking the object. Here, the system is further configured to read input data defining a measurement task to be carried out by at least a part of the system devices, to read status data indicating a current status of the system devices, to determine, based on the status data, a subgroup of the system devices to carry out the measurement task, and to provide an indication of at least part of the subgroup of system devices to carry out the measurement task.

For example, the status data comprise at least one of positional data of a current location of a system device, a power status of a system device, a power consumption rate of a system device, a measurement range of a system device, indication of a measurement accuracy of a system device, and indication of an occupancy time of a system device.

In a further embodiment, a first of the system devices has a visual and/or acoustic notification unit configured to indicate that the first system device is part of the subgroup of system devices.

In another embodiment, the system is configured to provide a second of the system devices with position data providing the position of a system device of the subgroup of system devices relative to the second system device, and the second system device is configured to transmit a visual pointing beam towards the position provided by the position data.

For example, the system comprises at least one of: a camera and a recognizer configured for generating image data and for determining the position data by recognizing features indicative of a system device of the subgroup of system devices; a visual positioning system configured for determining the position data by decoding location coordinates from visual markers arranged within the fixed measurement environment; and an indoor positioning system configured for determining the position data by utilizing wireless technology, e.g. based on radio signals, WiFi signals, and/or bluetooth signals.

In a further embodiment, the system is configured to determine, based on the status data, a free movement area for interacting with the group of system devices in order to carry out the measurement task, wherein the free movement area is configured that the group of system devices or any other object inside the free movement area are arbitrarily moveable without disturbing a measurement task carried out by any of the remainder of the system devices. Alternatively, or in addition, the system is configured to determine a restriction area based on the status data. Here, the system is further configured to provide a visual indication of at least one of the extent and location of the free movement area, and the extent and location of the restriction area.

A further aspect of the invention, taken separately or in combination with the other aspects of the invention, relates to a computer program product comprising program code which is stored on a machine-readable medium, or is embodied by an electromagnetic wave comprising a program code segment, and has computer-executable instructions for performing, e.g. when run on a computing device of a coordinate measuring device or system as described above, at least the following steps reading outer referencing data providing a fixed measurement environment represented in an outer coordinate system, wherein the measurement environment comprises at least a pointing device having a position which can be referenced with respect to the outer coordinate system and being configured to generate a visual laser pointing beam;

reading inner referencing data from a mobile user aid device, the inner referencing data indicating a position and orientation of the mobile user aid device relative to the fixed measurement environment;

determining a position and orientation of the mobile user aid device relative to the outer coordinate system based on the inner referencing data and the outer referencing data;

reading input data indicating coordinates of a guiding point in the outer coordinate system;

determining positional relationship data between the pointing device and the guiding point; and providing the positional data to the pointing device and instructing the pointing device to generate a visual laser pointing beam towards the guiding point, e.g. wherein the pointing device is a coordinate measuring device.

In one embodiment, the computer program product is configured to process as inner referencing data at least one of imaging data, e.g. data from a camera, smart phone, or video glasses, distance measurement data and/or angular measurement data, e.g. in the form of 3D point cloud data, data from an inertial measuring unit, and GNSS or DGNSS data.

In a further embodiment, the computer program product is configured to process as the outer referencing data at least one of imaging data, computer-aided design (CAD) data, 3D point cloud data, and GNSS or DGNSS data.

In a further embodiment, in addition to the pointing device, the measurement environment comprises as a further device a coordinate measuring device having a position which can be referenced with respect to the outer coordinate system. The computer program product is configured to instruct the further device to generate device data, particularly imaging data from a camera of the further device or point cloud data generated by a laser scanning unit of the further device, and the computer program product is configured to generate the outer referencing data based on the device data. For example, the computer program product is configured to provide a photorealistic 3D model based on the device data.

A further aspect of the invention, taken separately or in combination with the other aspects of the invention, relates to a coordinate measuring device, e.g. a laser tracker, configured to automatically align an aiming axis of the coordinate measuring device towards a movable accessory device in order to track the movable accessory device and to generate coordinate measuring data for determining a position, and particularly an orientation, of the movable accessory device. Here, the coordinate measuring device comprises an acoustic localization unit, e.g. with at least two microphones, wherein the acoustic localization unit is configured for detection and identification of an acoustic identifier signal, and for determination of the direction of origin of the acoustic identifier signal, wherein the coordinate measuring device is configured to automatically carry out an alignment of the aiming axis onto the direction of origin of the acoustic identifier signal.

In one embodiment, the coordinate measuring device is configured to detect and identify a specific acoustic identifier signal which is specific for the coordinate measuring device and/or which is specific for a group of coordinate measuring devices comprising the coordinate measuring device, wherein the specific acoustic identifier signal is a necessary prerequisite for carrying out the alignment of the aiming axis.

In a further embodiment, the coordinate measuring device comprises a visual target localization unit having a position detection sensor and being configured for localizing a cooperative target within the field of view of the position detection sensor, and for deriving localization data for aligning the aiming axis onto the cooperative target. Here, the coordinate measuring device is configured that following the alignment of the aiming axis onto the direction of origin of the acoustic identifier signal, the aiming axis is automatically aligned onto the cooperative target based on the visual target localization unit.

For example, the visual target localization unit has a viewing angle of more than 3°, particularly more than 10°.

In particular, the coordinate measuring device comprises a light source, particularly an LED, configured to generate a visible light cone indicative of the field-of-view of the visual target localization unit.

A further aspect of the invention, taken separately or in combination with the other aspects of the invention, relates to a metrology system with a laser tracker having: an opto-electronic distance meter configured to emit a distance measurement beam towards a cooperative target of a moveable accessory device in the direction of an aiming axis, and to provide distance measurement data based on at least a part of the distance measurement beam returning from the cooperative target; an angle determining unit configured to provide angle determination data for determining the pointing direction of the aiming axis; and a tracking unit. The tracking unit is configured to receive over a tracking channel a tracking signal which is indicative of a change in angular location of the cooperative target, to determine the change in angular location of the cooperative target based on the tracking signal, and to generate control data for adjusting the alignment of the aiming axis based on the determined change in angular location. Furthermore, the system comprises the movable accessory device, configured for scanning or probing of an object, e.g. at least one of tactile scanning, laser based scanning, and camera based scanning, and a computing unit configured to generate coordinate measuring data for the object based on the distance measuring data, the angle determination data, and the scanning and/or probing by means of the movable accessory device. Here, the system also comprises a referencing unit configured to generate referencing data with respect to a reference point associated with the object, the referencing data providing, independently from the opto-electronic distance meter, for a determination of a relative positional change between the referencing unit and the reference point, e.g. wherein the referencing data are distance measuring data or 3D point cloud data, wherein the referencing unit and the reference point are arranged with respect to the object such that a positional change between the referencing unit and the reference point is indicative of a movement of the object. The computing unit is configured to take into account the referencing data to generate the coordinate measuring data, e.g. wherein the referencing unit is provided by the laser tracker or by a separate device, wherein the separate device and the laser tracker are configured such that the referencing data are referencable to the coordinate measuring data.

For example, the reference point is embodied by a cooperative target mounted on the object or defined by a reference surface of the object, e.g. wherein the referencing unit is embodied as a camera unit, e.g. comprising two cameras arranged spaced apart from each other, the camera unit being configured to generate 3D data of the object based on imaging data. In particular, the camera unit comprises a projector configured to project a pattern of structured radiation onto the object, e.g. a fringe or Moiré projection pattern, and a processor configured to determine a 3D model of the object based on a photogrammetric method, e.g. a stereo-photogrammetric method, and by making use of the pattern of structured radiation.

In a further embodiment, the referencing unit is configured to detect a movement of the object in at least one degree of freedom, e.g. a vibration of the object, e.g. wherein the referencing unit is configured to detect at least one of a change in roll, a change in pitch, and a change in yaw angle of the object.

In a further embodiment, the computing unit is configured to generate the coordinate measuring data by at least one of: compensating a movement of the object determined based on the referencing data; ignoring distance measuring data of the opto-electronic distance meter and/or angle determination data of the angle determining unit in case a relative positional change between the object and the referencing unit exceeds an allowed threshold; and flagging the coordinate measuring data in case a relative positional change between the object and the referencing unit exceeds a threshold defined for ensuring a desired measurement accuracy of the coordinate measuring data.

A further aspect of the invention, taken separately or in combination with the other aspects of the invention, relates to a coordinate measuring device configured to generate coordinate measuring data, the coordinate measuring device having an opto-electronic distance meter configured to emit distance measurement radiation in the direction of an aiming axis and to provide distance measurement data based on at least a part of the distance measurement radiation. The coordinate measuring device further has an angle determining unit configured to provide angle determination data for determining the pointing direction of the aiming axis, and a tracking unit, wherein the tracking unit is configured to receive over a tracking channel a tracking signal which is indicative of a change in angular location of a cooperative target, to determine the change in angular location of the cooperative target based on the tracking signal, and to generate control data for adjusting the alignment of the aiming axis based on the determined change in angular location. A computing unit is configured to generate the coordinate measuring data for the object based on the distance measuring data and the angle determination data, and, for example, based on a scanning and/or probing by means of a movable accessory device comprising the cooperative target.

Here, the coordinate measuring device further comprises a referencing unit configured to generate referencing data with respect to a reference point, the referencing data providing, independently from the opto-electronic distance meter, for a determination of a relative positional change between the referencing unit and the reference point, e.g. wherein the referencing data are distance measuring data or 3D point cloud data, wherein the referencing unit is configured and arranged that the referencing data are referenceable to the coordinate measuring data, and wherein the computing unit is configured to take into account the referencing data to generate the coordinate measuring data.

For example, the referencing unit is embodied as a camera unit, e.g. comprising two cameras arranged spaced apart from each other, the camera unit being configured to generate 3D data of the object based on imaging data.

A further aspect of the invention, taken separately or in combination with the other aspects of the invention, relates to a metrology system with a plurality of coordinate measuring devices. Each coordinate measuring device has a target localization unit configured for localizing a target within the perimeter of the coordinate measuring device, e.g. wherein the target is a cooperative target, and for deriving localization data for aligning an aiming axis of the coordinate measuring device onto the target. Furthermore, each coordinate measuring device has a data acquisition unit configured for generating coordinate measuring data of an object to be measured, wherein each coordinate measuring device further comprises a reference target. The system has a referencing functionality configured to reference the coordinate measuring data of at least part of the coordinate measuring devices to a common coordinate system, wherein the referencing functionality comprises a first of the coordinate measuring devices automatically localizing a reference target of a second of the coordinate measuring devices and deriving first localization data for aligning its aiming axis with respect to the reference target of the second coordinate measuring device, a third of the coordinate measuring devices automatically localizing a reference target of a fourth of the coordinate measuring devices and deriving second localization data for aligning its aiming axis with respect to the reference target of the fourth coordinate measuring device, and referencing coordinate measuring data of the at least part of the coordinate measuring devices to the common coordinate system based on the first and the second localization data.

In one embodiment, the referencing is made with respect to a reference position provided by the position of one of the coordinate measuring devices, namely wherein this one of the coordinate measuring devices represents a fixed point in the common coordinate system. For example, the referencing is based on triangulation or multilateration.

In a further embodiment, the referencing functionality is carried out at an initialisation of the system, and/or based on a predefined referencing schedule, e.g. wherein the referencing functionality is carried out periodically.

In a further embodiment, the at least part of the coordinate measuring devices form a group of coordinate measuring devices and the system comprises a monitoring functionality configured to monitor an arrangement parameter with respect to the group of coordinate measuring devices. For example, the arrangement parameter is indicative of at least one of a group size, a positional relationship between group members, and an activity status of individual group members. Thus, the referencing functionality may be carried out based on the arrangement parameter, e.g. wherein a change of the arrangement parameter triggers the referencing functionality.

In a further embodiment, the plurality of coordinate measuring devices comprises a coordinate measuring device which hereafter is referred to as the overview device and which has a full dome search unit configured to generate search data providing an azimuth-altitude capture field of view around the overview device of at least 360° times 90°. For example, the full dome search unit comprises a panoramic camera or a camera arrangement configured to provide 360 degree panoramic image data, or the full dome search unit comprises a rotatable laser scanning unit configured to provide 3D point cloud data. The target localization unit of the overview device is configured for localizing a target, e.g. a reference target of another of the plurality of coordinate measuring devices, within the perimeter of the overview device based on the search data.

In a further embodiment, the plurality of coordinate measuring devices comprises a coordinate measuring device which hereafter is referred to as the power-lock device and which has a power-lock unit. The power-lock unit comprises a position detection sensor configured to generate position data for determining an impingement position of an impinging light beam onto the position detection sensor, and a light source, e.g. an LED, configured to radiate a search beam in the direction of the aiming axis, wherein a reflection of at least part of the search beam at a cooperative target is visible as an impinging light beam on the position detection sensor. The target localization unit of the power-lock device is configured for localizing a cooperative target within the perimeter of the power-lock device based on the position data of the power-lock unit.

In a further embodiment, the plurality of coordinate measuring devices comprises a coordinate measuring device which hereafter is referred to as the marked device and which has an arrangement of markings, disposed in a defined spatial relationship, forming a reflective and/or self-illuminated pattern on the body of the marked device. In addition, the plurality of coordinate measuring devices comprises a coordinate measuring device which hereafter is referred to as the pose determining device and which has a pose determination unit, e.g. comprising a camera, configured to determine a pose of the marked device by determining a distance to the reference target of the marked device and by determining an orientation of the arrangement of markings. Therefore, the referencing of the coordinate measuring data of the at least part of the plurality of coordinate measuring devices to the common coordinate system may be based on the pose of the marked device.

A further aspect of the invention, taken separately or in combination with the other aspects of the invention, relates to a laser tracker, with an opto-electronic distance meter configured to emit a distance measurement beam towards a cooperative target in the direction of an aiming axis and to generate distance measurement data based on at least a part of the distance measurement beam returning from the cooperative target. Furthermore, the laser tracker comprises an angle determining unit configured to generate angle determination data for determining the pointing direction of the aiming axis. The laser tracker has a first tracking unit configured to receive over a tracking channel a tracking signal which is indicative of a change in angular location of the cooperative target, to determine the change in angular location of the cooperative target based on the tracking signal, and to generate control data for adjusting the alignment of the aiming axis based on the determined change in angular location. The laser tracker also has a visual target localization unit having a position detection sensor and being configured for localizing the cooperative target within the field of view of the position detection sensor and for deriving localization data for an alignment of the aiming axis onto the cooperative target.

According to this aspect, the laser tracker comprises a second tracking unit with a camera for generating image data, wherein the second tracking unit is configured for video tracking of a target carrier carrying the cooperative target by generating image data by the camera, for determining a position of the target carrier within an image of the image data by use of a recognizer configured to recognize a target carrier within the image data, and for generating adjustment data for adjusting the aiming axis based on the determined position of the target carrier. Furthermore, the laser tracker is configured to derive a motion parameter indicative of the target carrier being in motion based on the image data, and to activate the visual target localization unit based on the motion parameter for providing the alignment of the aiming axis onto the cooperative target.

By way of example, the recognizer is configured to recognize the target carrier based on pre-defined recognition parameters providing at least one of recognition indicia for a type of the target carrier, recognition indicia for a specific target carrier, an identification code of the target carrier, information indicative of the spatial arrangement of the cooperative target relative to the target carrier, and positional information for the target carrier, e.g. an absolute position of the target carrier.

In one embodiment, the laser tracker is configured for training the recognizer for the target carrier wherein recognition indicia indicative of the appearance of the target carrier imaged by the image data are determined by image processing. For example, the training is based on image data generated in a locked state, wherein the tracking channel is undisturbed, namely such that the tracking signal is receivable without unscheduled interruption and the aiming axis is continuously adjusted based on the control data such that it is continuously following the cooperative target.

In a further embodiment, the motion parameter indicates a relative velocity of the target carrier with respect to the laser tracker, and the laser tracker is configured to activate the visual target localization unit when the relative velocity falls below a threshold velocity, e.g. when the relative velocity is essentially zero.

In a further embodiment, the video tracking is activated when the tracking channel is disturbed such that a continuous adjustment of the aiming axis for continuously following the cooperative target is compromised.

In a further embodiment, the visual target localization unit is configured for localizing the cooperative target within the field of view of the position detection sensor based on an arrangement parameter indicative of the spatial arrangement of the cooperative target relative to the target carrier, and the determined position of the target carrier within an image of the image data.

A further aspect of the invention, taken separately or in combination with the other aspects of the invention, relates to a metrology system configured to generate coordinate measuring data of an object. The metrology system comprises a coordinate measuring device configured to transmit a laser measurement beam along a laser axis, to move the laser axis into different spatial directions, and to generate directional data regarding an alignment of the laser axis and distance measurement data based on the laser measurement beam. The system further comprises a deflecting unit being separate from the coordinate measuring device and being configured to deflect the outgoing laser measurement beam coming along an incoming axis from the coordinate measuring device to a redirected axis, and to deflect returning parts of the laser measurement beam coming along the redirected axis from the object to the incoming axis. The deflecting unit is configured to set different deflection angles between the incoming and the redirected axis with respect to at least one rotation axis, wherein the system is configured for determining or being provided with alignment data providing a mutual alignment between the coordinate measuring device and the deflecting unit, for determining control data providing the different deflection angles, and for generating the coordinate measuring data by taking into account the directional data, the distance measurement data, the alignment data, and the control data.

In one embodiment, the deflecting unit comprises a movable reflective surface, e.g. wherein the reflective surface is movable with respect to two orthogonal rotation axes, particularly to three orthogonal rotation axes.

In a further embodiment, the reflective surface is a flat surface and comprises a fixed point with respect to the rotation about the two, particularly the three, rotation axes, and the coordinate measuring device and the deflecting unit are configured to carry out an autocollimation procedure for determining the orientation of the reflective surface.

In a further embodiment, the reflective surface is a flat surface and comprises a fixed point with respect to the rotation about the two, particularly the three, rotation axes. Furthermore, the reflective surface has a set of reference markings arranged in a fixed relationship with respect to the fixed point and the coordinate measuring device is configured to acquire an image of the reflective surface, the image comprising at least part of the reference markings, and based thereof, to determine the fixed point by image analysis of the image.

In a further embodiment, the system has a first data acquisition mode, wherein the laser measurement beam is directed past the deflecting unit and first coordinate measuring data are generated based on the directional data and the distance measurement data (i.e. the data are generated without interaction between the laser measurement beam and the deflecting unit). Furthermore, the system has a second data acquisition mode, wherein the laser measurement beam is directed onto the deflecting unit and the incoming axis is kept fixed, and second coordinate measuring data are generated by setting the deflection angle, particularly by setting a plurality of different deflection angles, and by taking into account the directional data, the distance measurement data, the alignment data, and the control data.

In a further embodiment, the system has an alignment mode, wherein the fixed point is determined and, for carrying out the second data acquisition mode, the laser axis is automatically set and kept fixed to a fixed position defined by the fixed point, e.g. wherein in the fixed position the laser axis pierces the fixed point.

In a further embodiment, the system is configured to determine a potentially upcoming measurement blind spot of the first data acquisition mode, namely of the coordinate measuring device. The measurement blind spot is defined by at least one of a reduced coordinate measuring accuracy by the coordinate measuring device depending on a relative position of the coordinate measuring device and the object, and an interfering object disturbing, e.g. intermitting, generation of distance measuring data by the coordinate measuring device. Furthermore, the system is configured to automatically switch from the first data acquisition mode to the second data acquisition mode in order to avoid the measurement blind spot.

By way of example, the coordinate measuring device has a nominal field of view for setting the laser axis to generate the distance measuring data, and the system comprises a plurality of deflecting units, e.g. a plurality of movable mirrors. For example, the deflecting units are arranged in a fixed positional relationship with respect to the coordinate measuring device. Furthermore, each of the deflecting units is associated with an extended field of view, which provides generation of coordinate measuring data in a field of view outside the nominal field of view of the coordinate measuring device, and the system is configured to automatically select one of the plurality of deflecting units in order to avoid the measurement blind spot.

In a further embodiment, the deflecting unit comprises a movable reflective surface, e.g. wherein the reflective surface is movable with respect to two orthogonal rotation axes, particularly to three orthogonal rotation axes. The deflecting unit comprises an arrangement of orientation markings, e.g. a set of at least three LEDs, the arrangement of orientation markings being configured to be co-moving with the movable reflective surface and indicative of the orientation of the reflective surface when analysing, in an image comprising at least part of the orientation markings, a spatial relation between the imaged orientation markings.

Therefore, for example, the coordinate measuring device may be configured to acquire a first image of the reflective surface, the first image comprising at least part of the arrangement of orientation markings. Alternatively, or in addition, the system may comprise a movable target configured to reflect at least part of the laser measurement beam, e.g. by means of a retro-reflecting element, wherein the movable target further comprises a camera and is configured to acquire a second image of the reflective surface, the second image comprising at least part of the arrangement of orientation markings. Thus, the system can be configured to determine, based on the first or second image, respectively, first orientation data providing an orientation of the reflective surface with respect to the coordinate measuring device, and/or second orientation data providing an orientation of the reflective surface with respect to the movable target. The first and/or the second orientation data may then be taken into account for generating the coordinate measuring data, e.g. wherein the system is configured to generate the coordinate measuring data such that they provide 6DoF orientation (6 degrees-of-freedom) of the object.

By way of example, the coordinate measuring device is configured to determine the first orientation data, and/or the movable target is configured to determine the second orientation data, e.g. wherein the acquisition of the first and/or second image is coordinated with acquiring the directional data, the distance measurement data, and the control data.

In a further embodiment, the coordinate measuring device and the deflecting unit are configured for real time communication with each other, e.g. via an EtherCat connection, for exchanging at least one of the control data and command data for changing the deflection angle.

In a further embodiment, the coordinate measuring device and the deflecting unit are arranged in a fixed positional relationship with respect to each other, e.g. wherein the coordinate measuring device and the deflecting unit are associated with a fixed measurement area.

In a further embodiment, at least one of the coordinate measuring device and the deflecting unit is configured to be movable, wherein the system is configured to adapt the orientation data by determining, particularly tracking, the position and particularly the orientation of the moveable coordinate measuring device or the movable deflecting unit, respectively.

A further aspect of the invention, taken separately or in combination with the other aspects of the invention, relates to a metrology system, with a scanning device configured to scan a region of interest on an object, e.g. by at least one of laser based scanning and camera based scanning, and, based thereof, to derive three-dimensional coordinate measuring data for the region of interest. The system further has an imaging device configured to capture two-dimensional imaging data of the object, and a segmentation algorithm configured to analyse two-dimensional imaging data and to detect features of interest within the two-dimensional imaging data. Here, the system is configured that the field of view of the imaging device is referenceable to a targeting axis of the scanning device, wherein the system is further configured to automatically detect within two-dimensional imaging data captured by the imaging device a feature of interest to be scanned by the scanning device, and to automatically provide a setting parameter of the scanning device for scanning, by the scanning device, a region of interest comprising the detected feature of interest.

In one embodiment, the segmentation algorithm is configured to detect features of interest comprising at least one of an edge, a surface, a curvature, a texture, a hole, a stud, a thread, and a color of the object. For example, the segmentation algorithm is based on an artificial intelligence algorithm, more particularly wherein the segmentation algorithm is configured to carry out semantic segmentation.

In a further embodiment, the system is configured to automatically set the scanning device based on the provided setting parameter. In particular, the system is configured to determine a current offset (distance) between the scanning device and the region of interest comprising the detected feature of interest, wherein the system is configured to provide the setting parameter as a function of the determined current offset.

In a further embodiment, the provided setting parameter defines at least one of perimeter boundaries of the region of interest comprising the detected feature, a point density provided by the three-dimensional coordinate measuring data of the scanning device, a scan frequency of the scanning device, an intensity of a laser measurement beam of the scanning device, an exposure time of a camera of the scanning device, and a gain setting of a detector of the scanning device.

In a further embodiment, the system is configured to automatically set, based on the provided setting parameter, an orientation of the targeting axis of the scanning device onto the region of interest comprising the detected feature of interest.

In a further embodiment, the system comprises a set of pre-defined texture and/or color parameters for identifying the feature of interest to be scanned by the scanning device, and the system is configured to make a selection among detected features within the two-dimensional imaging data based on the pre-defined texture and/or color parameters in order to identify the feature of interest to be scanned by the scanning device.

In a further embodiment, the system is configured to carry out, by the scanning device, an overview scan of the object comprising at least part of the object, and, based thereof, to derive three-dimensional coordinate measuring data. Furthermore, the system is configured to analyse the three-dimensional coordinate measuring data derived by the overview scan and to detect a feature of interest within the three-dimensional coordinate measuring data from the overview scan, and to provide the setting parameter of the scanning device based on the detected feature of interest within the three-dimensional coordinate measuring data.

A further aspect of the invention, taken separately or in combination with the other aspects of the invention, relates to a metrology system, comprising a coordinate measuring device having a light source for generating measurement radiation, e.g. a laser measurement beam. The coordinate measuring device is configured to generate coordinate measuring data for determining a position of a measurement point based on the measurement radiation. The system further comprises nominal operation data providing a nominal operating condition of the light source comprising at least one of a maximum number of initialization cycles of the light source, a nominal temperature range of the light source during operation, and a nominal temperature range of the environment during operation of the light source. Here, the system is configured to generate usage data of the light source and to generate a prediction model providing a degradation estimate of the light source based on a comparison of the usage data with the nominal operation data, wherein the usage data comprise at least one of operating hours of the light source, a number of initialization cycles of the light source, a temporal recording of temperature data of the light source, and a temporal recording of temperature data of the environment.

In one embodiment, the system is configured to generate the prediction model based on a selection among the usage data, wherein the selection is based on a determined deviation of a current operating condition indicated by the usage data from the nominal operating condition indicated by the nominal operation data.

In a further embodiment, the system is configured to generate quality monitoring data providing a temporal recording of a data quality of the coordinate measuring data, and to generate the prediction model based on the quality monitoring data.

In a further embodiment, the system is configured to generate the prediction model, particularly the selection among the usage data, based on an artificial intelligence algorithm.

BRIEF DESCRIPTION OF THE DRAWINGS

The inventive aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
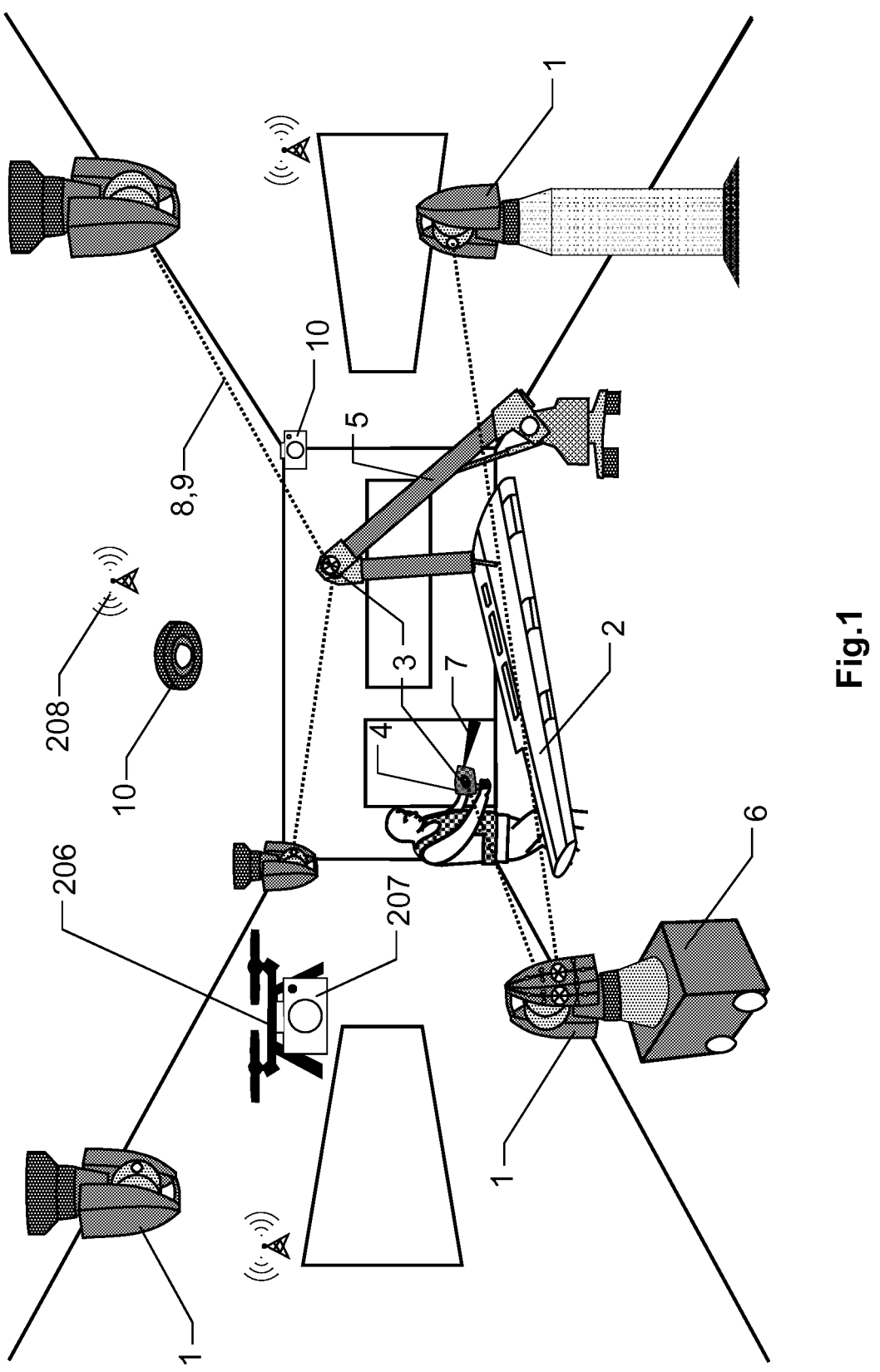
FIG. 1: exemplarily illustrates an arrangement of different metrology devices in a defined measurement environment providing for different workflows.

FIG. 1 exemplarily illustrates a so-called "smart factory" or "metrology environment", i.e. an environment having a defined arrangement of different metrology devices, configured such that coordinate measuring data generated by different metrology devices are referencable to a common coordinate system, particularly by means of at least one coordinate measuring device, such as a laser tracker or a scanner, arranged at a fixed position within the smart factory.

The figure shows an exemplary use case, e.g. measuring and quality control of a workpiece 2 in industrial automobile or aircraft production.

A typical metrology measurement system for determining 3D coordinates of an object 2 comprises a coordinate measuring device with tracking functionality, in the following also referred to as a tracker, configured to automatically track a movable accessory device and to generate coordinate measuring data indicative of the position, and often also the orientation, of the movable accessory device. For example, the tracking capability of the tracker may be provided by at least one of a video tracking unit, a radio frequency tracking unit, and by optical tracking based on emitting a tracking beam towards a cooperative target.

The movable accessory device is configured for scanning the object 2, e.g. by means of tactile scanning, laser based scanning, and/or camera based scanning, and/or the movable accessory device is configured for carrying out an intervention on the object 2, e.g. for manufacturing and/or marking the object 2. For example, the movable accessory device may be embodied as scanning device configured to approach the object and to carry out a coordinate measurement itself, e.g. wherein the mobile accessory device is a hand-held scanner 4, a tactile probing or scanning device 29,30A,30B (see FIG. 8), an articulated arm robot 5, an x-ray inspection device, or a stereo imaging device. The mobile accessory device may also be a marking device for marking the object or a tool and/or manufacturing instrument. Furthermore, the accessory device can also be a further laser tracker, e.g. a laser tracker configured to have a scanning functionality.

Metrology systems are often configured that coordinate measuring data of accessory devices are typically referenceable to the coordinate system of one of the coordinate measuring devices, e.g. one of the fixed laser trackers, or to an outer coordinate system of a group of coordinate measuring devices.

By way of example, a movable accessory device is embodied as a handheld scanner 4 configured to emit a local scanning beam 7 in order to scan the object surface in a local coordinate system, wherein the position of the handheld scanner 4 is tracked and measured by a laser tracker 1, and the measuring points of the handheld scanner 4, typically coordinate measuring data in a local coordinate system, are referencable to the coordinate system of the laser tracker 1.

Both the movable accessory device and the tracker may also be mounted to a robot, e.g. a UGV 6 ("unmanned ground vehicle") carrying a tracker 1 or a UAV 206 ("unmanned aerial vehicle") carrying a photogrammetry camera 207.

By way of example, the tracker is embodied as an industrial laser tracker 1, which provides for high-precise coordinate measuring and tracking of a cooperative target 3, e.g. a passive reflecting unit with defined reflecting properties such as a steel sphere of known dimensions or a retroreflecting unit such as a cubic prism, wherein at least parts of a laser beam emitted by the laser tracker 1 are reflected back, e.g. in parallel, to the laser tracker. Alternatively, the cooperative target may be an active unit emitting radiation having defined emission properties and/or according to a defined radiation pattern, e.g. provided by one or multiple laser diodes or LEDs, which is identified by the tracking unit of the coordinate measuring device. In other words: In the context of the present application, the term "cooperative target" relates to a target specifically foreseen to be used in conjunction with a tracking unit in order to enable generation of a tracking signal. Thus, the cooperative target "cooperates" with the tracking unit in that it has at least one of distinct reflection properties, distinct emission properties, a known shape, and known dimensions.

The basic structure of a typical laser tracker 1 comprises an opto-electronic distance meter to determine a distance to an object based on a laser measuring beam 8, wherein the aiming direction of the laser measuring beam 8 can be varied in a motorized movement, e.g. with respect to one or more independent spatial directions.

Opto-electronic laser distance meters have now become standard solutions in many areas, wherein various principles and methods are known in the field of electronic or electro-optical distance measurement.

One approach is to emit pulsed electro-magnetic radiation, e.g. laser light, to a target to be measured and to subsequently receive an echo from this target as a back-scattering object, wherein the distance to the target to be measured can be determined by the time-of-flight (ToF), the shape, and/or the phase of the pulse. Another approach is to use an interferometric distance measuring principle, particularly an absolute (i.e. frequency scanning) interferometry method, a frequency modulated continuous wave method (FMCW, particularly C-FMCW), the Fizeau principle, and/or a Frequency comb principle.

Furthermore, the laser tracker 1 comprises a tracking unit for providing an automatic adjustment of the aiming direction of the laser measuring beam 8 such that the measuring beam 8 is continuously tracking a target point, wherein a direction of the emission of the laser measuring beam 8 is determined by means of sensors for angle measurement, e.g. angle encoders.

By way of example, for the purpose of continuous target tracking, a deviation of a returning tracking beam 9, e.g. part of the distance measuring beam 8 or a separately emitted tracking beam, may be used to determine a deviation from a zero position on a tracking sensor. By means of this measurable deviation, the aiming direction of the tracking beam 9 can be corrected or continuously adjusted in such a way that the deviation on the tracking sensor is reduced.

As tracking sensor, a position-sensitive detector (PSD) may be used, e.g. an area sensor which functions in an analog manner with respect to position, with the aid of which a centroid of a light distribution on the sensor surface can be determined.

In order to achieve a high level of accuracy, the visual field of such a PSD is typically selected to be comparatively small, e.g. corresponding to the beam diameter of the tracking beam 9. Therefore, the use of such a PSD-based tracking must be preceded by a coupling of the tracking beam 9 to the cooperative target 3. Thus, problems may occur when the cooperative target 3 moves so abruptly and rapidly that it disappears from the visual range of the PSD detector. Furthermore, coupling may be lost when the line of sight is interrupted, even in case the interruption only occurs during a brief moment.

In addition, many different workers and/or movable accessory devices such as articulated arm robots 5 may work on the same object. If two cooperative targets 3 cross each other the tracking beam related to the target in the background may be blocked by the target carrier of the target in front. In such cases, the laser tracker 1 may carry out a so called power-lock procedure, e.g. an automatic localization of a cooperative target 3, to automatically re-lock the tracking beam 9 to a cooperative target 3.

For example, a power-lock unit comprises a position detection sensor configured to generate position data indicative of an impingement position of an impinging light beam onto the position detection sensor, and a light source, e.g. an LED, configured to radiate a search beam in the direction of the aiming axis, wherein a reflection of at least part of the search beam at a cooperative target is visible as an impinging light beam on the position detection sensor.

However, since typical power-lock procedures only scan in a quite narrow searching field of view, it may happen that instead of re-locking the tracking beam onto the cooperative target in the background the tracking beam is falsely locked onto the cooperative target in front. In the extreme case, the laser tracker may not even notice this wrong re-lock and thus continue to track the wrong target.

Various principles and methods are known in order to hold the tracking beam 9 in the "coupled" state even during rapid and abrupt movements of the target object or during interruption of the tracking beam 9.

For example, the laser tracker 1 has a camera configured to have a comparatively wide field-of-view, i.e. configured to capture the cooperative target 3 as well as the target carrier 4,5,6 and a substantial part of the background. Therefore, on the basis of image processing, e.g. by way of a computer vision algorithm to detect and track a worker in a video stream generated by the camera, the track of the target object or movements of objects moving along with the target object can be determined and used to easier locate the cooperative target 3 and to couple (re-lock) the laser beam again in the event that the cooperative target 3 has been lost from the "coupled" state.

Alternatively, or in addition, tracking (of a target by a tracker or generally tracking a device within the metrology system) may be based on other known position determining devices mounted within the smart factory and/or on the laser tracker and/or on a target carrier, e.g. based on a local radio frequency positioning system 208 such as WLAN positioning or 5G positioning 208. Thus, the tracking signal may be embodied as an optical tracking beam 9 but also as any other kind of wireless transmission signal to exchange positional information between the laser tracker 1 and a target carrier 4,5,6.

The movable accessory device 4,5 may have some markers (not shown) for pose determination and the tracker may have an orientation camera (not shown), wherein the tracker is configured to determine a 6DoF pose (6 degrees of freedom, i.e. position and orientation) of the movable accessory device by means of image processing. Often, the movable accessory device 4,5 also has additional pose determination means, e.g. an inertial measurement unit and/or a visual inertial system, and is configured for wireless communication with the tracker.

At least part of the coordinate measuring devices and movable accessory devices of the smart factory/metrology environment are configured to communicate to each other, e.g. by device-to-device communication and/or communication over a central computer. In addition, the smart factory/metrology environment may comprise further auxiliary measuring and detection devices configured to communicate with the coordinate measuring devices and/or movable accessory devices. For example, at least part of the devices of the smart factory may be configured for peer-to-peer communication within a company internal, e.g. secured, 5G network.

For example, the smart factory may comprise additional surveying devices 10, e.g. a fisheye camera mounted at the ceiling or a camera mounted in a corner of the smart factory, configured to monitor at least a subarea of the smart factory and to recognize objects, e.g. a laser tracker, a movable accessory device, and/or a person. Also, the surveying device may be mobile, e.g. mounted on an AGV or UAV. Thus, in case a laser tracker 1 is unable to find a lost, e.g. temporally decoupled, cooperative target 3, the surveying camera 10 provides a wider search area than the field of view of a power-lock camera of the laser tracker 1 in order to at least provide the laser tracker 1 with a rough location estimate of the lost cooperative target.

Alternatively, or in addition, since coordinate measuring data generated by different metrology devices within the smart factory are referencable to each other, instead of having a dedicated surveying device 10, a set of trackers and/or movable accessory devices may also be configured to share between each other some of their sensor information as mutual auxiliary search and surveying information. For example, the laser tracker which has lost its cooperative target may query information of a camera of another laser tracker in order to find and locate the lost target.

The defined measurement environment made available by the smart factory/metrology environment provides for new and/or improved workflows and measurement systems wherein some exemplary aspects are explained in more detail below.

It goes without saying that a skilled person will recognize that individual aspects of the metrology system and coordinate measuring devices described below can be combined with each other.

In particular, although not always mentioned explicitly, it is assumed that the term "coordinate measuring device" relates to a device configured to generate coordinate measuring data for determining a position of a measurement point, e.g. based on a laser measurement beam or based on imaging. For example, the term coordinate measuring device may relate to a tracker and/or scanner, e.g. an industrial laser tracker for tracking and precise coordinate determination of a target object or a 3D-scanner for scanning an environment.

For example, the basic structure of a laser based coordinate measuring device comprises: an opto-electronic distance meter configured to emit a distance measurement beam in the direction of an aiming axis, in the case of a laser tracker towards a cooperative target, wherein the opto-electronic distance meter is configured to determine distance measurement data based on at least a part of returning radiation of the distance measurement beam; and an angle determining unit configured to provide angle determination data for determining the pointing direction of the aiming axis.

Laser trackers further comprise a tracking unit configured to receive over a tracking channel a tracking signal which is indicative of a change in angular location of the cooperative target, to determine the change in angular location of the cooperative target based on the tracking signal, and to generate control data for adjusting the alignment of the aiming axis based on the determined change in angular location.

Thus, typically, a laser tracker works in conjunction with a movable accessory device, which is a device configured for scanning an object, particularly for tactile scanning, laser based scanning, and camera based scanning, and/or for carrying out an intervention on the object, particularly for manufacturing and/or marking the object. In particular, the accessory device may also be a further coordinate measuring device, e.g. a further laser tracker or scanner as outlined in the embodiments below.

The term "cooperative target" relates to a target specifically foreseen to be used in conjunction with the tracking unit in order to enable generation of the tracking signal. In other words, the cooperative target "cooperates" with the tracking unit of the laser tracker in that it has at least one of distinct reflection properties, distinct emission properties, a known shape, and known dimensions.

A skilled person will appreciate that a metrology system may be configured to recognize different types of cooperative targets, and that whenever a cooperative target is used to represent a particular target point to be measured, the system is configured to resolve any offset or ambiguity between the position of the cooperative target and the actual measurement point represented by that target, e.g. wherein the system may identify different reflector types such as a triple prism and a cateye prism and automatically have access or knowledge of relative addition constants with respect to their types and mounting positions.

For example, a cooperative target mounted onto a laser tracker may be arranged and configured in such a way, that a measurement onto that cooperative target is referenceable to a defined point of that laser tracker, e.g. the point of origin of the tracking beam generated by that laser tracker being marked with the cooperative target.

Figure 2A:
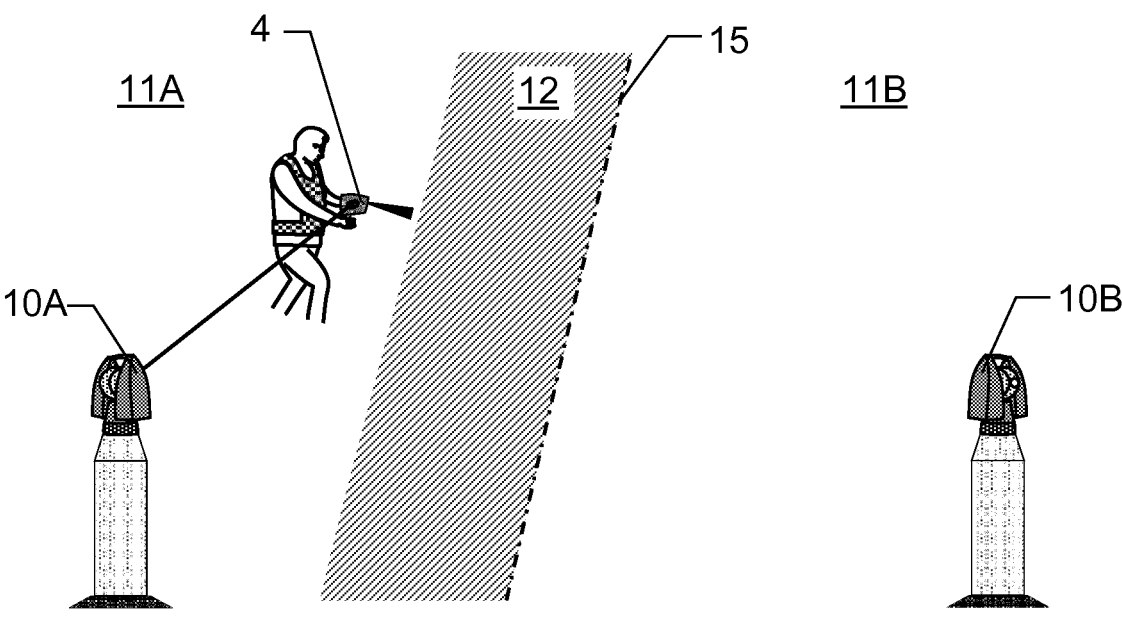
FIG. 2a-c: exemplarily illustrates seamless measuring with multiple laser trackers in a smart factory.
Figure 2B:
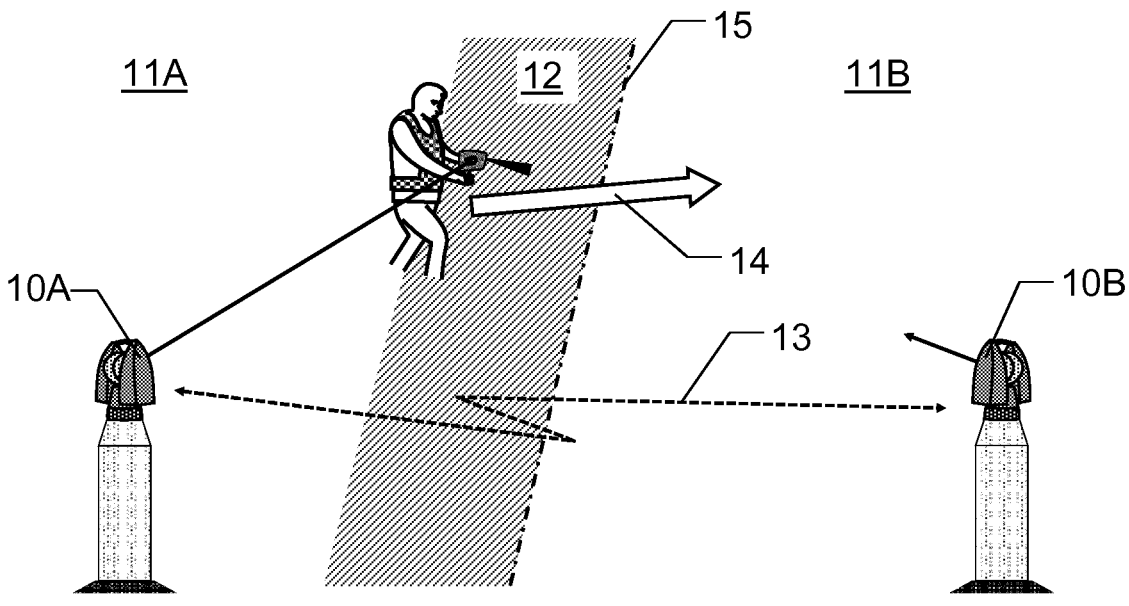
Figure 2C:
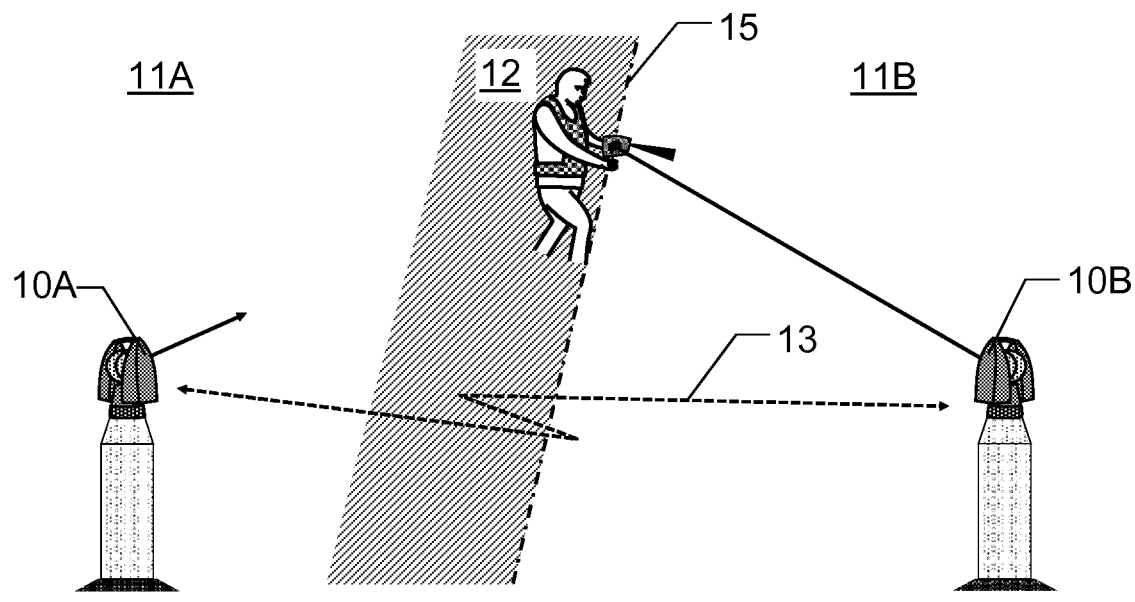

By way of example, one benefit of having a set of trackers being referencable to each other in the smart factory is that seamless measuring with multiple trackers can be provided as schematically depicted by FIGS. 2a to 2c.

According to this embodiment, the metrology system comprises at least a first 10A and a second 10B tracker, e.g. laser trackers. Each of the two trackers 10A,10B is configured to automatically track a movable accessory device, e.g. a handheld scanner 4.

By way of example, tracking may be based on a tracking beam of a tracking unit as described above, or the trackers 10A,10B may be configured for video tracking of an object captured by a camera of the trackers 10A,10B.

Furthermore, the two laser trackers 10A,10B are arranged in a fixed positional relationship such that their generated coordinate measuring data are referenceable to a common tracker coordinate system, e.g. a so-called global smart factory coordinate system or a local coordinate system of one of the two laser trackers 10A,10B.

By way of example, the two laser trackers 10A,10B are configured to provide their raw or processed data to a central computing unit for further processing and for merging the coordinate data of different coordinate systems. Alternatively, central processing may also be carried out by one of the laser trackers 10A,10B, e.g. one of the laser trackers 10A,10B being configured as a dedicated reference laser tracker.

Furthermore, the two laser trackers 10A,10B are configured to communicate to each other, e.g. by device-to-device communication and/or communication over a central communication node, and each of the two laser trackers 10A, 10B is assigned to a different measurement area 11A,11B.

For example, a measurement area 11A,11B may be defined relative to the respective laser tracker 10A,10B, e.g.

wherein a nominal measuring range of the laser tracker defines a nominal measuring area around the laser tracker. A measurement area 11A,11B may also be specifically defined as any area within reach of the laser tracker 10A,10B, i.e. a specific area of the smart factory to be covered by the respective laser tracker. It goes without saying that the measurement area 11A,11B may be adaptable, e.g. depending on different measuring tasks or system conditions.

The first laser tracker 10A is configured to track the handheld scanner 4 when it is located within a first measuring area 11A and the second laser tracker 10B is configured to track the handheld scanner 4 when it is located within a second measuring area 11B. Referring now to FIG. 2a, the handheld scanner 4 is located well inside the first measuring area 11A and thus tracked by the first laser tracker 10A while the second laser tracker 10B is in standby or tracking a different target object (not shown).

In FIG. 2b, the handheld scanner 4 is located within a transition area 12 of the first measuring area 11A interfacing with the second measuring area 11B. The first laser tracker 10A sends out a position signal, e.g. as trigger signal 13 as soon as the handheld scanner 4 enters the transition area 12. For example, the trigger signal is sent in the form of a broadcast signal or a signal specifically addressing the second laser tracker 10B, notifying at least the second laser tracker 10B that the handheld scanner 4 is located within the transition area 12.

By way of example, the first laser tracker 10A may further be configured to estimate a motion path 14 of the handheld scanner 4, e.g. in order to specifically address a suitable laser tracker to potentially "take over" the movable accessory device or to let a central computing unit estimate the motion path 14, choose and address a suitable laser tracker to take over. In particular, the laser tracker 10A or the central computing unit may be configured to estimate a time period until the movable accessory device leaves the first measuring area.

The position signal, here the trigger signal 13, at least comprises positional information for the handheld scanner 4 such that, as depicted by FIG. 2c, the second laser tracker 10B can start at least a rough tracking of the handheld scanner 4, e.g. even in case the handheld scanner 4 is still not visible for the second laser tracker 10B. Therefore, as soon as the handheld scanner 4 reaches a transition boundary 15 it is "handed over" from the first laser tracker 10A to the second laser tracker 10B essentially without causing an interruption of the measurement.

Figure 3:
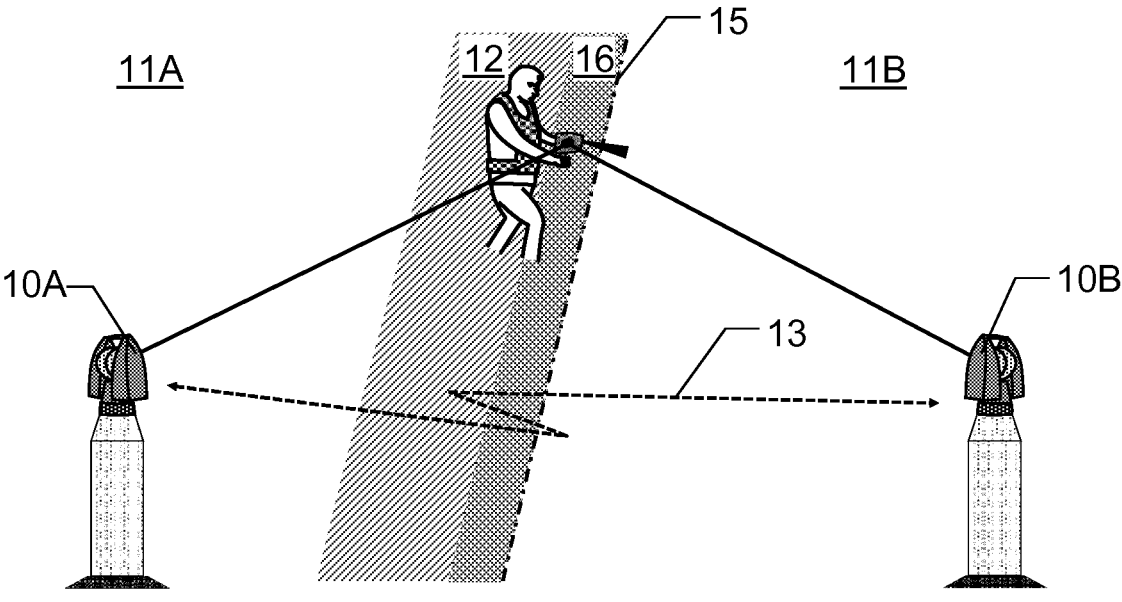
FIG. 3: shows an embodiment for seamless measuring with multiple laser trackers in a smart factory based on a transition area and a handover area between two laser trackers.

For example, the second laser tracker 10B may be configured to lock onto the handheld scanner 4 as soon as the scanner 4 is within a handover area 16 as shown by FIG. 3, e.g. by carrying out a power-lock procedure. Thus, within the handover area 16 both laser trackers 10A,10B are coupled onto the handheld scanner 4 providing a seamless handover at the transition boundary 15.

The handover prerequisites may be essentially "static" in the sense that fixed measuring areas 11A,11B are assigned to different laser trackers 10A,10B. However, the measuring areas 11A,11B and/or the transition area 12 may also be dynamically adapted, e.g. depending on a current measuring situation and/or a current arrangement of objects in the smart factory.

Figure 4:
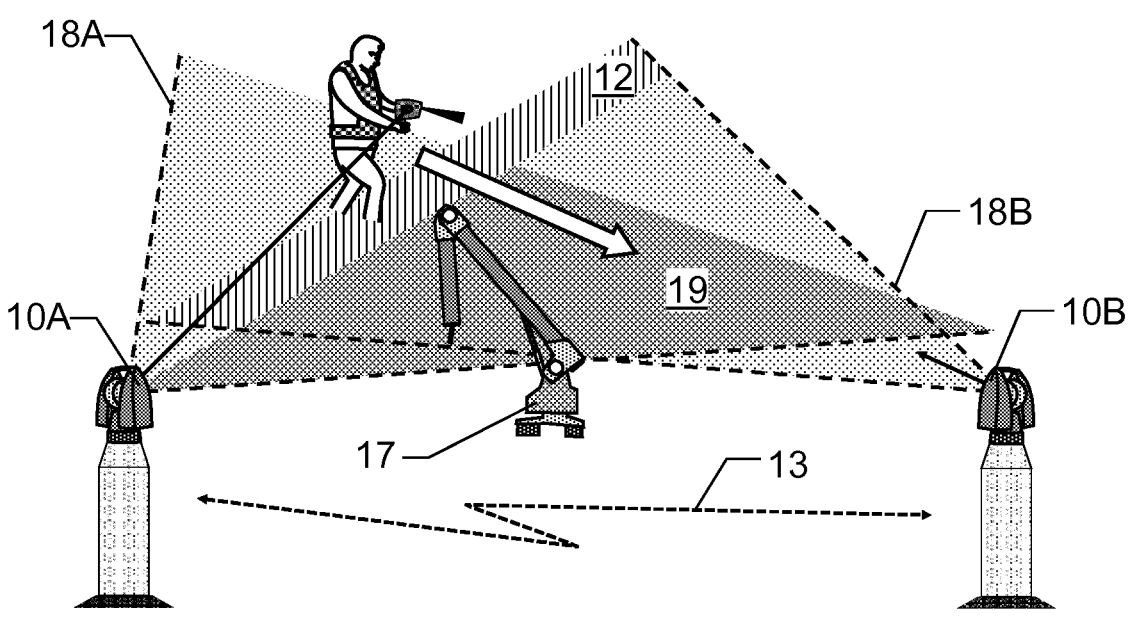
FIG. 4: exemplarily illustrates seamless measuring with multiple laser trackers in a smart factory based on a situational handover between laser trackers.

FIG. 4 shows an exemplary example of such a "dynamic" handover, wherein the first laser tracker 10A is configured to request a situational handover, e.g. in case of a decrease in coordinate measuring accuracy and/or tracking accuracy, and/or in case an interfering object 17 is detected within the field of view 18A of the first laser tracker 10A, i.e. an object that will potentially interfere with the tracking beam of the first laser tracker 10A.

By way of example, the measuring area of the first laser tracker 10A is generally given as a circular measuring range around the laser tracker and the first laser tracker 10A comprises a panoramic camera arrangement configured to provide 360 degreepanoramic image data. The interfering object 17 is then recognized within the panoramic image data based on image processing and a feature recognition algorithm. Furthermore, the laser tracker is configured to determine at least a rough position of the interfering object 17 within its field of view 18A and to determine a blind spot area 19 where its tracking beam is potentially blocked by the interfering object 17.

The first laser tracker 10A then requests a situational handover comprising a comparison of the measuring areas and/or field of views 18B of surrounding laser trackers 10B with its own measuring area and the determined blind spot area 19, and a determination of a transition area 12 based on the comparison, i.e. for a handover procedure with another laser tracker 10B as previously described.

Figure 6A:
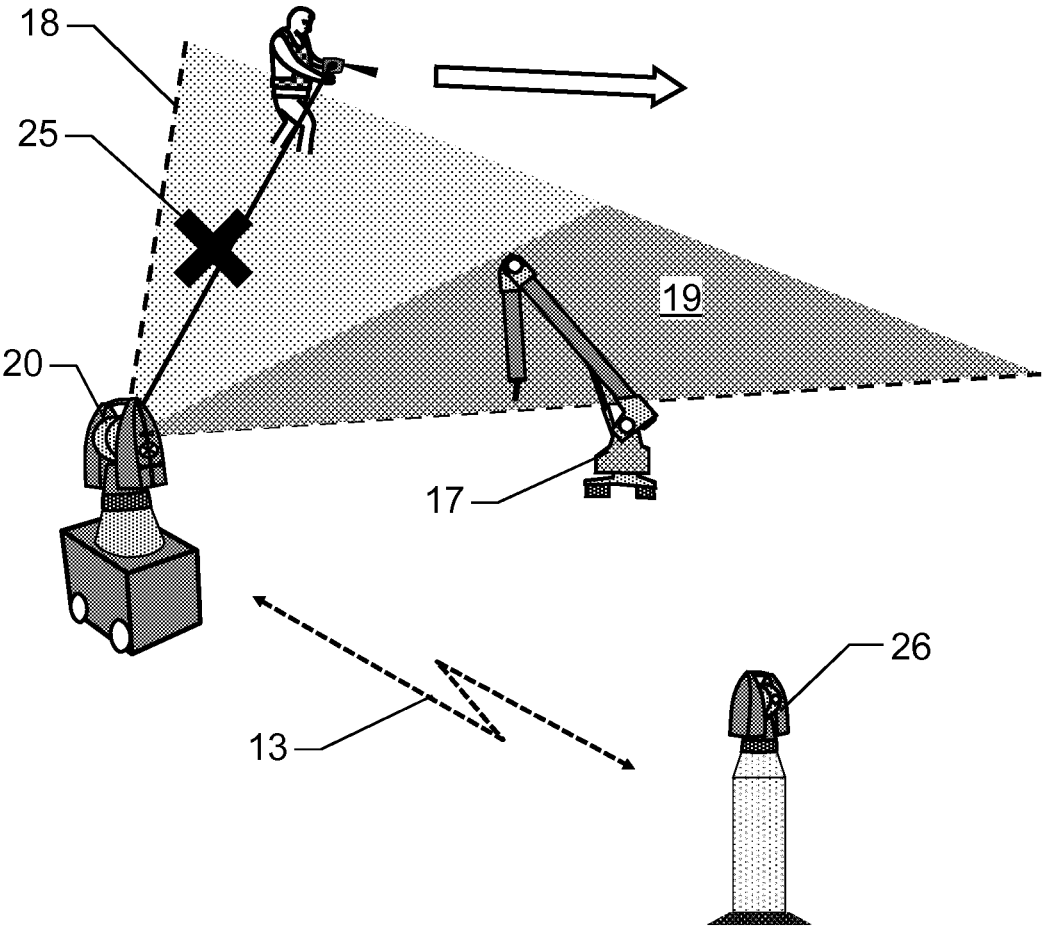
FIG. 6a,b: depicts an exemplary use case of a movable laser tracker in order to avoid measurement blind spots.
Figure 6B:
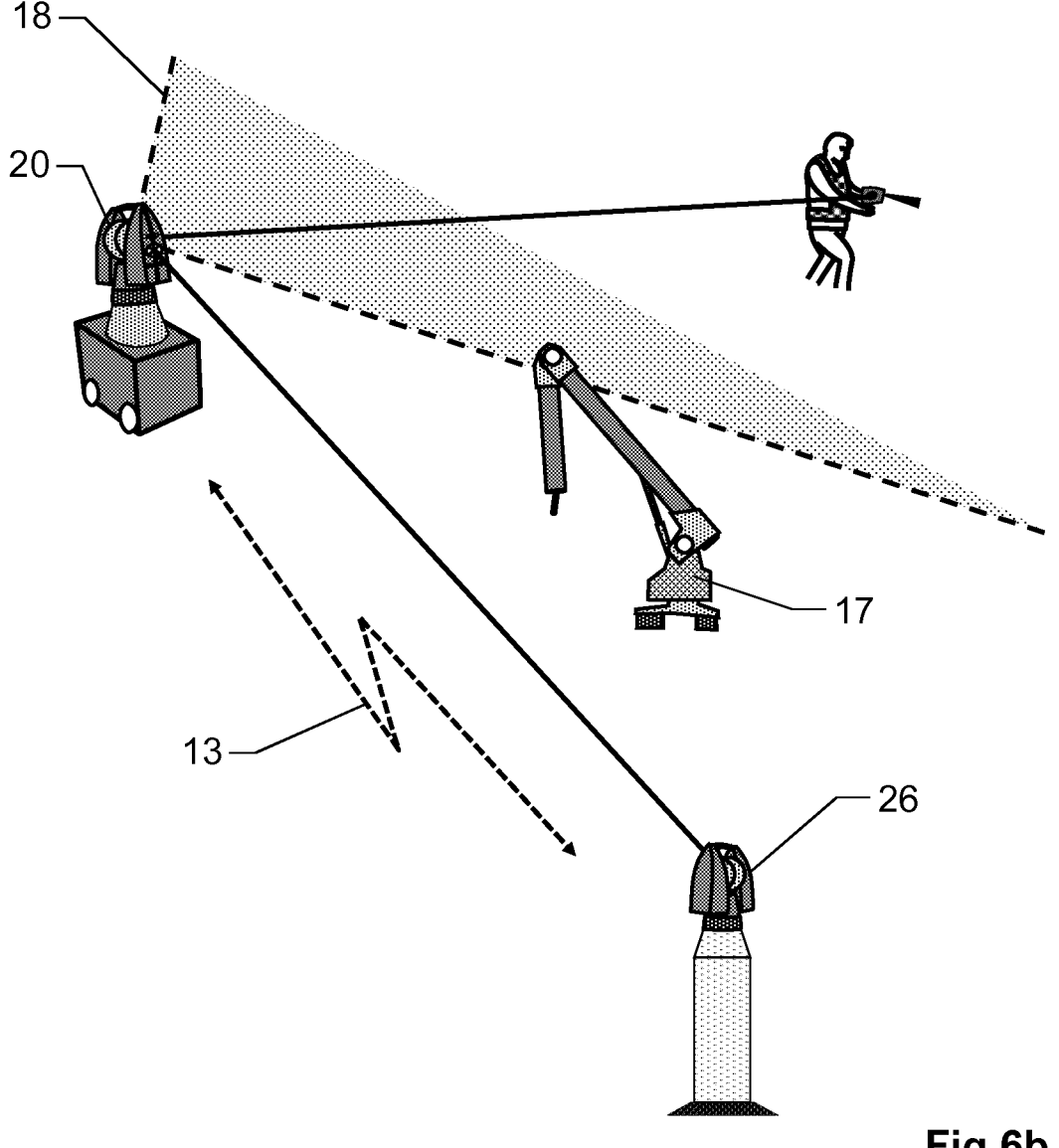

Alternatively, or in addition, a tracker may be configured to be automatically movable in order to avoid a blind spot by repositioning to another tracker location (e.g. see FIG. 6a,6b). However, in order to reference the determined coordinates with respect to the common coordinate system, e.g. the smart factory coordinate system, the movement of the movable tracker needs to be tracked by a reference tracker having a well-defined position with respect to the common coordinate system.

Figure 5:
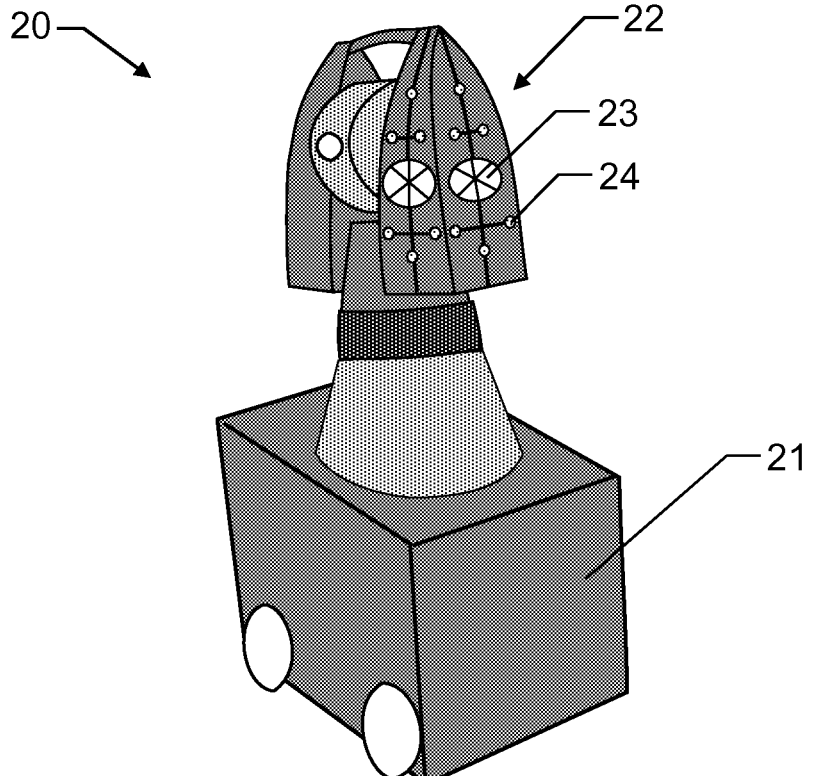
FIG. 5: depicts an exemplary embodiment of movable laser tracker configured to be tracked by a reference laser tracker.

FIG. 5 depicts an exemplary embodiment of a movable coordinate measuring device, e.g. a movable laser tracker 20, configured to be tracked by a reference laser tracker. The movable laser tracker 20 may have structural features as known by a state-of-the art geodetic or industrial laser tracker. In addition, the laser tracker 20 has a mounting interface which is specifically foreseen for mounting the laser tracker to an automated guided vehicle 21 (AGV), e.g. an UGV ("unmanned ground vehicle"). Thus, the laser tracker 20 is configured to be automatically movable within the smart factory.

For example, the movable laser tracker 20 is configured to move according to a fixed guidance system installed in the smart factory, i.e. essentially along a fixed track or the movable laser tracker 20 is configured for free movement, e.g. wherein the laser tracker 20 and/or the AGV 21 are configured to be moved based on a positioning or guidance system such as 5G positioning, radio positioning, e.g. based on ultra-wideband radio signals, or WLAN positioning, or wherein the laser tracker 2 and/or the AGV 21 are configured for simultaneous localization and mapping (SLAM).

Furthermore, the movable laser tracker 20 comprises a measuring aid 22 configured in such a way and arranged in a fixed relationship with the laser tracker 20 such that a movement and orientation of the measuring aid 22 is indicative of a movement and orientation of the movable laser tracker 20. For example, the measuring aid 22 is mounted on the laser tracker 20 (or the AGV 21) or is embodied as an integral part of the movable laser tracker 20. In particular, the movable laser tracker 20 may comprise one or multiple such measuring aids 22, e.g. arranged at different faces of the laser tracker.

The measuring aid 22 comprises a retroreflector 23 configured to be tracked by a reference laser tracker 26 (FIG. 6a), surrounded by an arrangement of markings 24 forming a reflective and/or self-illuminated pattern enabling the reference laser tracker to determine with high precision an orientation of the movable laser tracker 20. Thus, the measuring aid 22 enables another laser tracker, e.g. comprising a camera for capturing the measuring aid 22, to determine a pose, i.e. position and orientation, of the movable laser tracker 20, particularly a 6DoF pose.

Therefore, as depicted by FIG. 6a (before movement) and FIG. 6b (after movement), the movable laser tracker 20 may be configured to detect an interfering object 17 within its field of view 18, i.e. an object that will potentially interfere with the tracking beam of the movable laser tracker 20. For example, the movable laser tracker 20 may comprise a camera and be configured to detect the object 17 based on image processing and a feature recognition algorithm.

Furthermore, the laser tracker is configured to determine at least a rough position of the interfering object 17 within its field of view 18 and to determine a blind spot area 19 where its tracking beam is potentially blocked by the interfering object 17. Based on this information a suitable re-location position 25 for avoiding the measurement blind spot 19 can be determined.

The movable laser tracker 20 can then be sent to the re-location position 25, wherein at least the end position of this movement is determined by a reference laser tracker 26. For example, before starting to move the movable laser tracker 20 sends out a trigger command 13 in order to request tracking by an external referencing device 26, e.g. wherein the trigger command comprises information on the current position of the movable laser tracker 20 and/or on the re-location position 25.

Figure 7:
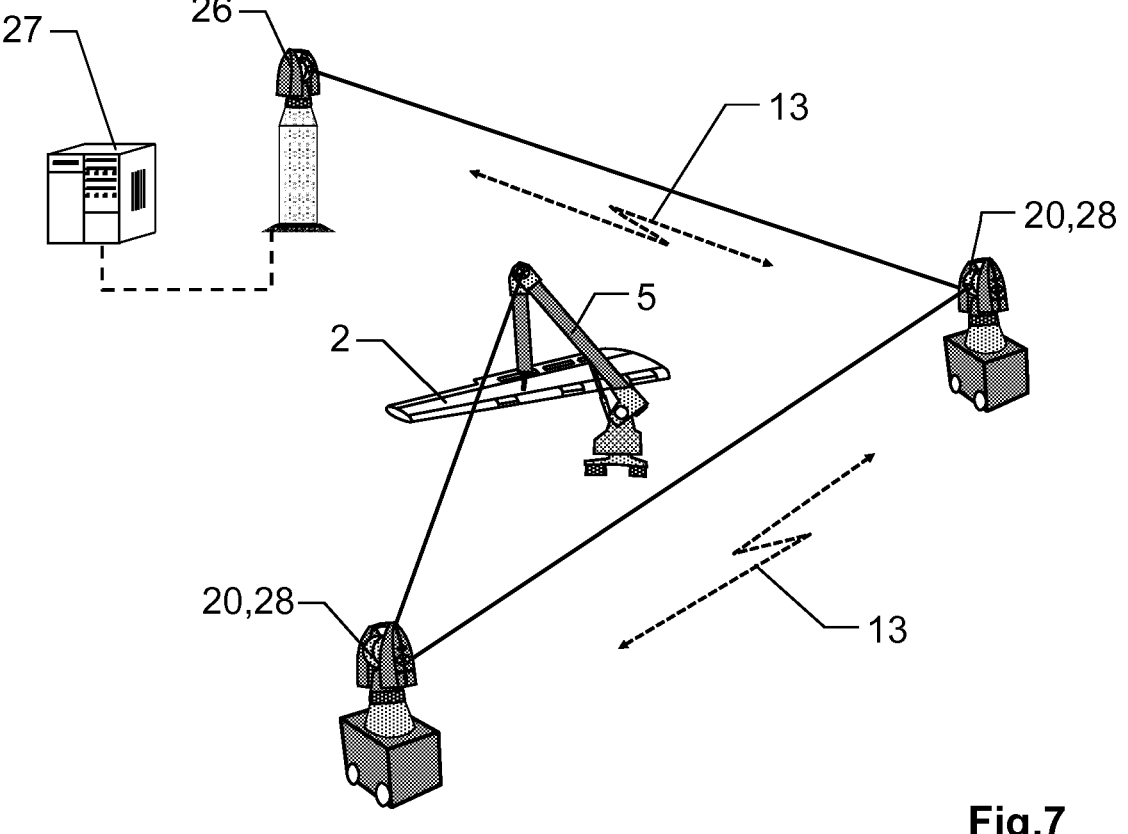
FIG. 7: depicts another use case of a movable laser tracker as part of a measuring chain formed by multiple laser trackers.

As shown by FIG. 7, the above described movable laser tracker 20 may also be part of a measuring chain formed by a multitude of such movable laser trackers 20.

By way of example, a fixedly installed reference laser tracker 26 is used with respect to which the coordinate measuring data of multiple laser trackers and other movable accessory devices are referenced. However, it is also possible that one of the movable laser trackers 20 is configured to act as reference laser tracker. In particular, a dedicated external computing unit 27 in connection to at least the reference laser tracker 26, may be foreseen for data processing and data merging.

Thus, the reference laser tracker 26 and a multitude of movable laser trackers 20 form a variable laser tracker arrangement, wherein each change of the arrangement is automatically tracked, i.e. the reference laser tracker 26 and each movable laser tracker 20 except the last movable laser tracker in the measuring chain are configured to automatically track a respectively assigned movable laser tracker 20, e.g. wherein each movable laser tracker 20 is configured to send out a trigger command 13 for requesting a tracking by its upstream laser tracker. In other words, each movable laser tracker 20 is configured to act as a relay device 28 between the reference laser 26 tracker and a movable accessory device, here in the form of an articulated arm robot 5.

In industrial metrology a wide range of different sensors and measurement devices may be used, wherein typically each sensor and device having multiple operation modes requires dedicated setup procedures. Quite often correct setup and combination of different devices for a particular measurement procedure requires some degree of expert knowledge.

Figure 8:
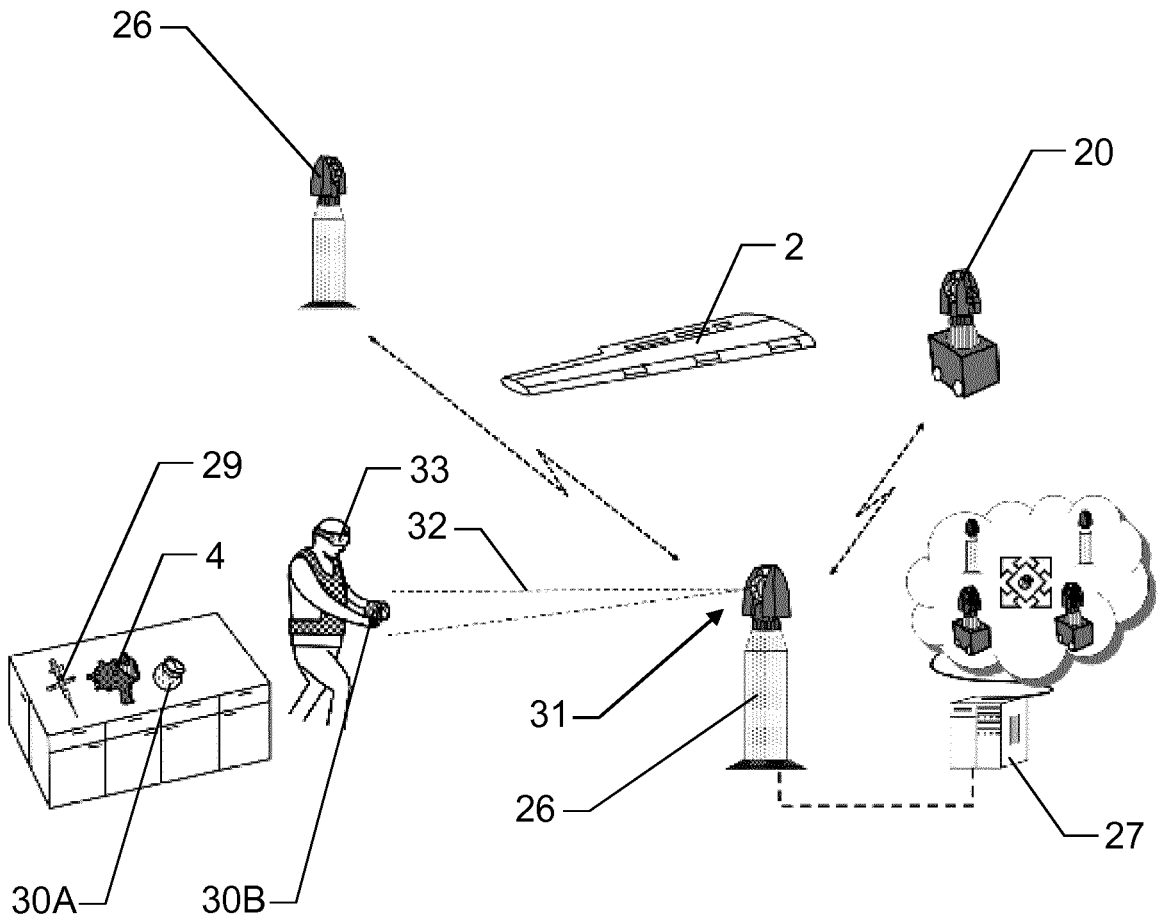
FIG. 8: shows an exemplary embodiment of a metrology system, configured for aiding a user to correctly setup and operate a plurality of coordinate measuring devices.

FIG. 8 shows an exemplary embodiment of an inventive metrology system, aiding a user to correctly setup and operate a plurality of coordinate measuring devices based on selecting a movable accessory device from a plurality of movable accessory devices.

By way of example, the plurality of coordinate measuring devices comprises two fixed laser trackers 26 and a movable laser tracker 20. The plurality of movable scanning and/or probing devices comprises a handheld scanner 4, a tactile 6DoF probe 29, and a set of different retroreflecting prisms 30A,30B.

One of the fixed laser trackers comprises an examination arrangement 31 configured for generating examination data, e.g. an examination camera. The examination arrangement may be configured to automatically recognize an object placed within an examination field of view 32. Alternatively, the examination arrangement may be configured that generation of examination data is triggered by user input.

The examination arrangement 31 is coupled to a computing unit 27 comprising an evaluator, configured to provide classification of a movable accessory device 30B captured by the examination data, and comprising a database with preset information for the plurality of coordinate measuring devices 20,26 associated with respect to different scanning and/or probing devices 4,29,30A,30B to be used in combination with the coordinate measuring devices 20,26.

According to one embodiment, the system is configured to automatically carry out a recognition of a movable accessory device 4,29,30A,30B placed in the examination field of view 32 of the laser tracker and to automatically classify the recognized movable accessory device. The image data of the examination arrangement 31 is then provided to the computing unit 27 providing classification of the recognized prism 30B into a corresponding probe class, e.g. based on a comparison of the image data of an examination camera with template images of the plurality of accessory devices 4,29,30A,30B stored in an image database.

Based on the classification, the computing unit 27 automatically provides dedicated preset instructions to the plurality of coordinate measuring devices 20,26.

In particular, presetting may comprise at least one of switching-on at least a subgroup of the coordinate measuring devices and carrying out a calibration procedure to calibrate the subgroup of coordinate measuring devices, e.g. to load relative addition constants of the recognized prism 30B and to reference each device of the subgroup with respect to a common coordinate system.

In addition, the system may further comprise a database with operating instructions for at least part of the coordinate measuring devices and/or at least part of the accessory devices. For example, the system comprises a user aid device, e.g. video glasses 33, configured to provide step-by-step operating instructions to a user based on the classification, particularly wherein the user aid device is configured to work with augmented reality technology, e.g. is embodied as augmented reality glasses or as an augmented reality helmet.

By way of example, the operating instructions comprise at least one of instructions for setting a movable accessory device, instructions for setting a coordinate measuring device, instructions for using a movable accessory device in conjunction with a coordinate measuring device, and cautionary information, particularly with regard to user safety and measurement accuracy.

For example, presetting of the devices and/or provision of operating instructions may further be based on the skill level of a user operating the system, e.g. wherein the system is configured to read information from an RFID tag carried by a user, the RFID tag comprising information about a user category assigned to the user. For example, the system has access to a database comprising user details such as a list of system users and/or a list of user categories linked to information regarding levels of user training and/or user authorization.

Figure 9:
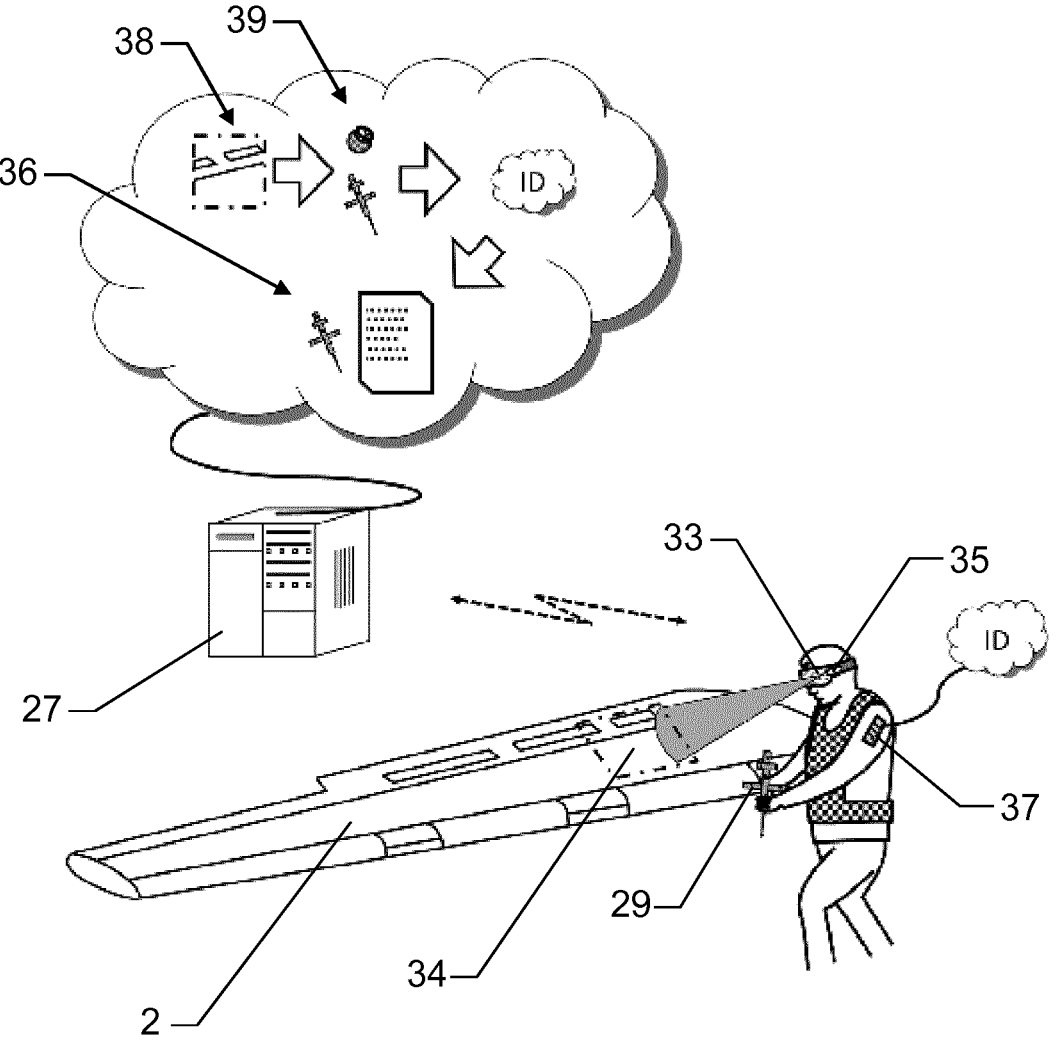
FIG. 9: shows another exemplary embodiment of a metrology system, configured for automatically providing measurement instructions for an identified measurement area attributed to an object to be measured.

FIG. 9 shows an embodiment of an inventive metrology system, aiding a user by automatically providing measurement instructions for an identified measurement area 34 attributed to an object to be measured 2.

By way of example, the system comprises an examination camera 35, e.g. a RIM camera mounted to a user aid device 33, configured for generating examination data, e.g. 3D range imaging data.

Furthermore, the system comprises an evaluator, e.g. based on an image processing and feature extraction algorithm, for classification of the examination data in order to identify a measurement area 34 on an object 2 to be measured, i.e. wherein the measurement area 34 requires to be measured by a dedicated measuring procedure, e.g. wherein some measurement areas 34 require punctual coordinate measurements by a tactile probe 29 at some reference positions while other measurement areas 34 require a local scan with a certain point resolution, e.g. by a stereo-camera arrangement. The examination camera 35 may be configured to automatically generate examination data, e.g. based on sequential or continuous data acquisition, and to automatically recognize different measurement areas 34. Alternatively, the examination camera may be configured that generation of examination data is triggered by user input.

In order to provide the necessary computing power for classification of the examination data, identification of the measurement area 34 may be executed on a dedicated computing unit 27 connected to the examination camera 35.

Based on the identified measurement area 34, a user is provided with an instruction 36 to use a specific movable accessory device, e.g. a tactile 6DoF probe 29, particularly together with instructions on how to use the specific movable accessory device, e.g. instructions for setting the specific movable accessory device and an associated laser tracker as well as how to use the accessory device in conjunction with the associated laser tracker.

For example, the provision of the measurement instructions 36 for the identified measurement area 34 are provided as visual and/or acoustic instructions, e.g. wherein written instructions are provided to a user by video glasses 33, particularly working with augmented reality technology to directly indicate at least approximate measuring positions within the measurement area 34.

In particular, the provision of the measurement instructions 36 may consider a training level of the user, e.g. wherein the user carries an RFID identification tag 37 providing a user category with associated user skills indicating usable measurement devices.

For example, based on the classification 38 of the measurement area 34, the system determines a preselection 39 of suitable movable accessory devices for executing the necessary measurement tasks for measuring the measurement area, wherein the preselection 39 is further reduced based on the user ID in order to provide the final selection 36 of accessory devices and corresponding instructions.

By way of another example, the system is configured that the provision of the measurement instructions is based on a settable nominal measurement parameter for the measurement area, e.g. wherein a user defines a nominal point density or accuracy to be achieved, i.e. necessitating a particular accessory device to be used, and/or the system may be configured to perform a tradeoff analysis to optimize the overall measurement time.

Figure 10:
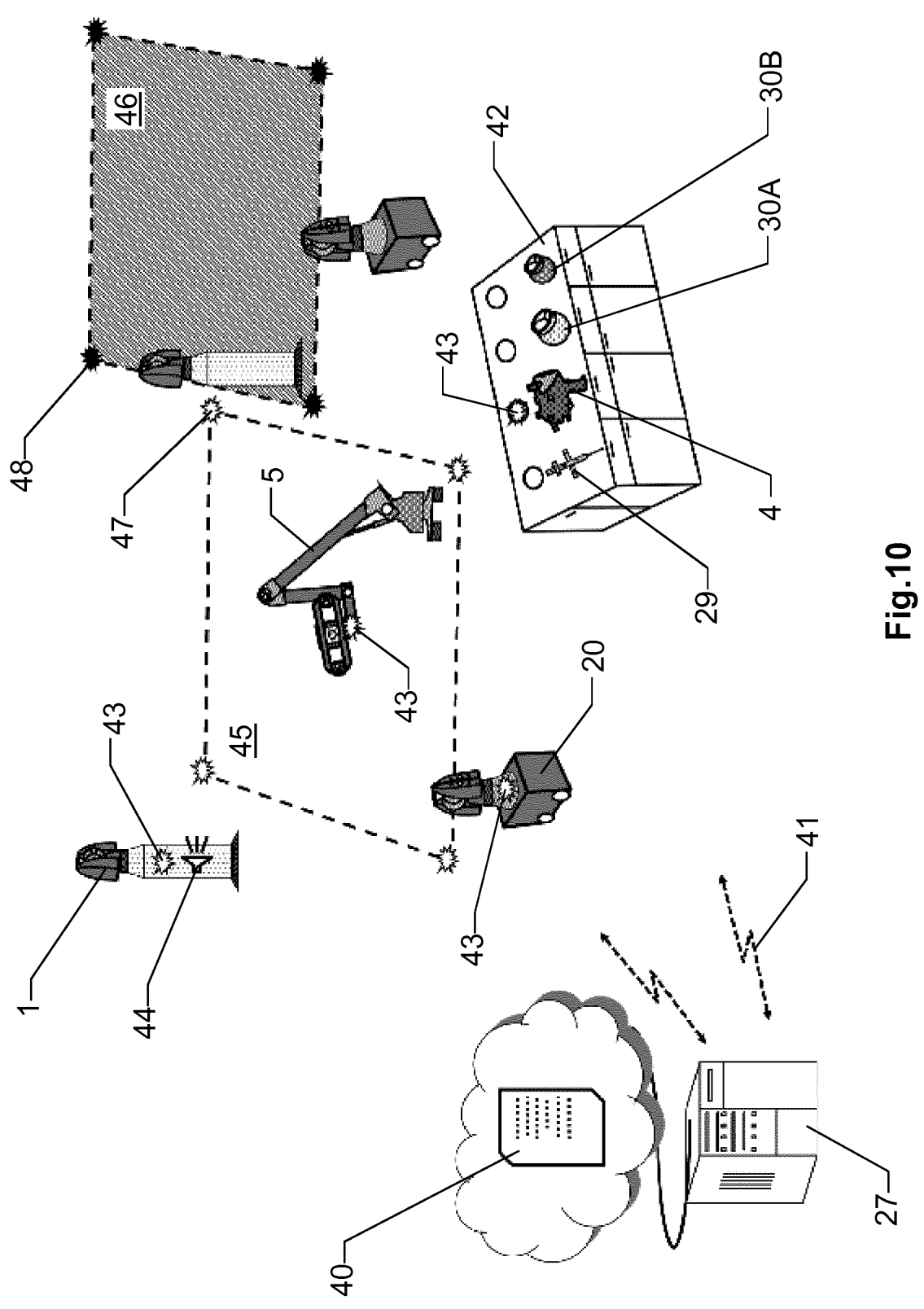
FIG. 10: shows another exemplary embodiment of a metrology system, configured for selecting a group of measurement devices to carry out a measurement task, based on status information from a plurality of measurement devices.

FIG. 10 shows another exemplary embodiment of an inventive metrology system, wherein a user is provided with an indication of available measurement devices for carrying out a specific measurement task and wherein an improved coordination of parallel measurements is enabled.

By way of example, in a metrology area a plurality of different measurement devices is present, e.g. coordinate measuring devices such as a static laser tracker 1 and a movable laser tracker 20, and a variety of movable accessory devices such as tactile 6DoF probes 29, retro-reflective prisms 30A,30B, handheld scanning devices 4, and stereo-scanners, e.g. a stereo-camera mounted on an articulated arm robot 5.

Often a particular measuring task may be carried out using different sets of measuring devices, wherein selection of an appropriate set of devices typically requires an over-view of available measurement devices and some level of expert knowledge.

In particular, in an extensive metrology environment, e.g. a large construction hall with many workers, an overview of the availability of measurement devices can be cumbersome because many measuring tasks are running in parallel and many workers are using devices from the same set of devices at the same time. In addition, some devices may be subject to degradation effects or even be broken or under repair.

Furthermore, it has to be ensured that workers or devices carrying out different measuring tasks do not interfere each other, e.g. by blocking each other's laser measuring beams.

According to this embodiment of the invention, the metrology system is configured to capture status information indicative of a current status of a plurality of measurement devices and to use the status information to determine a suitable group of measurement devices from the plurality of measurement devices to carry out a given measurement task.

For example, the system may comprise a central comput-ing unit 27 configured to have access to a predefined list of measurement tasks to be carried out, wherein for each measuring task at least one group of device types is defined which may be used for carrying out the task. A user may then select one measuring task 40 out of the list of measuring tasks to be carried out next. Alternatively, instead of select-ing a pre-defined measuring task the system may also be configured that a user sets different measurement parameters and thus defines a new measuring task 40 and which types of measurement devices may be suitable.

In addition, the system comprises a communication net-work 41 configured to provide communication between measurement devices 1,4,5,20,29,30A,30B and the comput-ing unit 27. Some measurement devices 4,29,30A,30B may not be able to directly communicate with the computing unit 27. However, when unused they may be stored in a storage unit 42 having dedicated shelfs for placing each device type 4,29,30A,30B and being configured to recognize if a device is stored and ready to use. The storage unit 42 is further configured for communication over the communication net-work 41 and thus provides at least information on the availability of these devices 4,29,30A,30B. Additionally, the storage unit 42 may further be configured to provide further status information on the stored measurement devices 4,29, 30A,30B, e.g. wherein the status information is automati-cally derived or manually stored by a user.

Upon selection/definition of the measuring task 40 to be carried out next, or, for example, in a continuous manner, the system is configured to capture the actual status of the plurality of measurement devices, e.g. wherein a broadcast or multicast signal is sent over the communication network 41 requesting a response from the measurement devices 1,5,20 and the storage unit 42. For example, the response may comprise at least positional information indicative of a current location or availability of the respective measure-ment device 1,4,5,20,29,30A,30B.

Based on the selection/definition of the measuring task 40 and the actual status of the measurement devices 1,4,20,29, 30A,30B the system determines a group of measurement devices, particularly with suitable measurement instructions to be used for the measurement task 40.

The group of measurement devices is then made recog-nizable to a user by visual 43 and/or acoustic 44 notifica-tions, e.g. wherein the measurement devices are configured to provide a red (occupied) and green (available) color code or simply an on/off code (e.g. LED on=available, LED off=occupied), and/or an acoustic pattern.

Alternatively, or in addition, the system may comprise a pointer unit (not shown) configured to emit a directed visual pointing beam towards measurement devices to be used, i.e. to mark measurement devices by pointing to them. For example, a laser tracker 1 may be configured to point to a movable scanner and/or probe 4,29,30A,30B which has to be used in conjunction with the tracker 1. The computing unit 27 may also be connected to a display (not shown), configured to provide information, e.g. device locations, about the group of measurement devices.

The system may further be configured to, particularly continuously, gather the status of the plurality of measure-ment devices, e.g. at least the position and an activity indication, in order to determine a free movement area 45 for interacting with the group of measurement devices and/or a restriction area 46 which shall not be entered. Within the free movement area 45 the group of measurement devices to be used for carrying out the measuring task 40 or any other object, e.g. a person carrying a handheld scanner 4 for carrying out a local scan of an object to be measured, can freely move without the risk of disturbing a measurement task carried out by the remainder of the plurality of mea-surement devices. The other way round, an area associated with a measurement task carried out by the remainder of the plurality of measurement devices may be determined to be a restriction area 46.

The extent and location of a free movement area 45 and/or a restriction area 46 are made visible to the workers in the metrology environment, e.g. by dedicated LED markings 47,48 on the ground or by a video projecting system configured to project dedicated markings onto a surface in the smart factory.

In addition, the system may be configured to monitor the restriction area 46 and to generate an alarm signal in case a person and/or object enters the area, e.g. based on a moni-toring system using RFID tags, indicating access right to different areas 45,46 of the metrology environment.

Figure 11A:
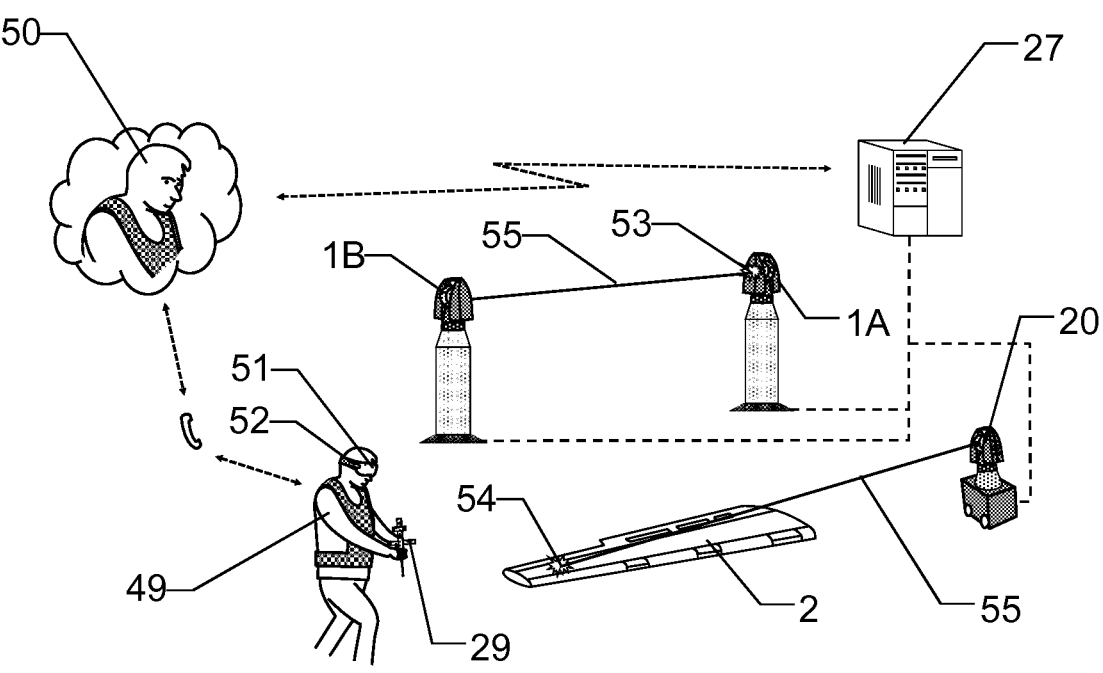
FIG. 11a,b: shows a system for remote support, making use of an environment having a plurality of different metrology devices which are referencable to a common coordinate system.
Figure 11B:
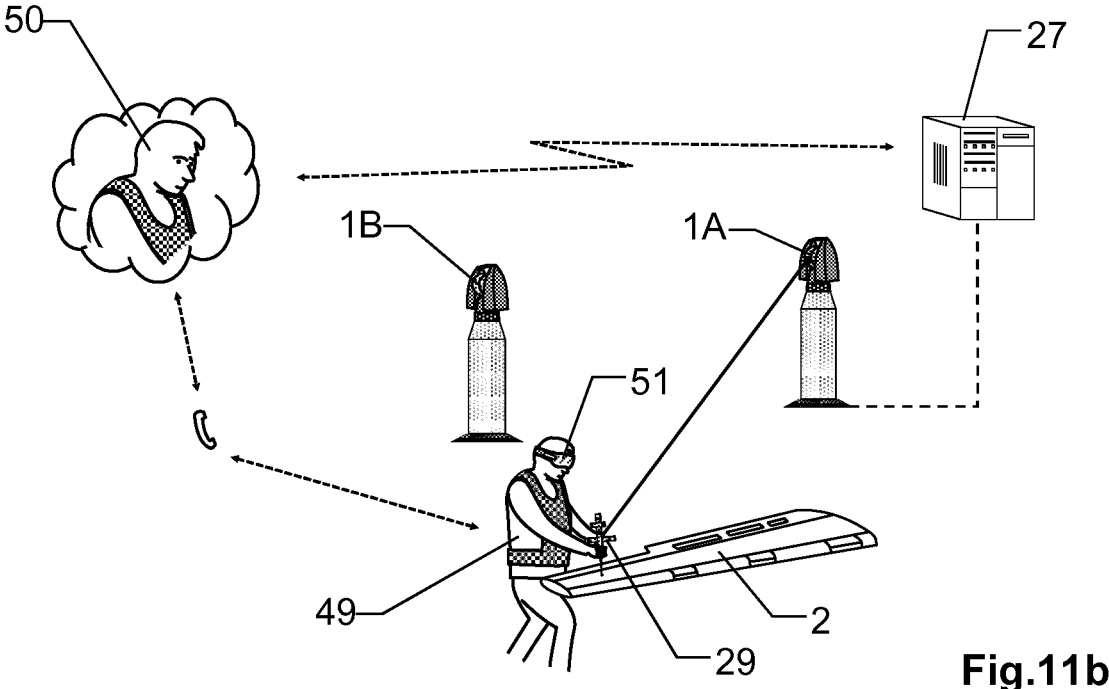

FIGS. 11a and 11b exemplarily illustrate a system for remote support making use of the well-defined smart factory environment, i.e. an environment having a plurality of different metrology devices which are referenceable to a common coordinate system.

The system is a measurement environment comprising coordinate measuring devices, e.g. fixed laser trackers 1 and movable laser trackers 20, having positions which are ref-erenceable with respect to an outer coordinate system.

By way of example, in a conventional remote support system an onsite worker wears smart glasses equipped with a camera configured such that a remote expert has access to a current view of the onsite operator wearing the smart glasses. Thus, the remote expert can guide the onsite worker through a task to fix a problem.

However, even having a realtime onsite view it may be cumbersome to guide the onsite worker 49 through a complicated measuring task, e.g. involving correct setup of different measuring devices at different locations within the measurement environment and approaching various measurement points.

According to this embodiment of the invention, guiding an onsite worker 49 is particularly sped up and facilitated in that the remote expert 50 has the possibility to remotely use onsite devices 1,20 for pointing at different measurement devices and locations where the onsite worker 49 needs to take some action, e.g. measuring or investigating something.

In order to provide this pointing functionality, the system is configured to process inner referencing data from a mobile user aid device 51, e.g. smart glasses with a camera 52, the inner referencing data being indicative of a position and orientation of the mobile user aid device 51 relative to the fixed measurement environment. For example, the inner referencing data may be imaging data, distance measuring data, and/or data from an inertial measuring unit of the user aid device 51.

Thus, based on the inner referencing data and outer referencing data indicative of the measurement environment represented in an outer coordinate system, the remote support system can determine a position and orientation of the mobile user aid device 51 relative to the outer coordinate system.

Furthermore, the system is configured to read input data provided by the remote expert 50, the input data defining guiding points within the measurement environment, e.g. a position of a measurement device 53 or a position of a point to be measured 54. For example, the remote expert 50 may explicitly provide coordinates of the guiding points 53,54 in the outer coordinate system and/or the remote expert may provide a point ID, e.g. a particular measurement device, wherein the point ID is automatically linked by the system to associated point ID coordinates. Then, based on this input data, a coordinate measuring device, e.g. a laser tracker 1,20 configured to generate a visual laser pointing beam 55, is instructed to point to one of the guiding points 53,54.

By way of example, as depicted by FIG. 11a, the measurement environment comprises two fixed laser trackers 1A,1B and a movable laser tracker 20, which are linked to a central computing unit 27 and referenceable to a common coordinate system. The remote expert 50 guides the onsite worker 49 to measure a particular measurement point 54 on an object to be measured 2 by using a tactile probe 29 and one of the two fixed laser trackers 1A as indicated by FIG. 11b. The fixed laser tracker to be used 1A and the approximate location to carry out the measurement are indicated by generating two pointing beams 55, i.e. using the other fixed laser tracker 1B and the movable laser tracker 20.

In particular, the outer coordinate system may also be generated based on data from one of the measurement devices 1A,1B,20, e.g. image data from a camera or point cloud data generated by a laser scanning unit. For example, the outer referencing data may be based on a so called full dome scan by one of the measurement devices 1A,1B,20, i.e. imaging or point cloud data providing an essentially 90° (vertical) times 360° (azimuthal) field of view. In particular, a photorealistic 3D model can be derived from these data of one of the measurement devices, such that a geometrical 3D twin of the measurement environment is accessible for the remote expert 50.

Figure 12A:
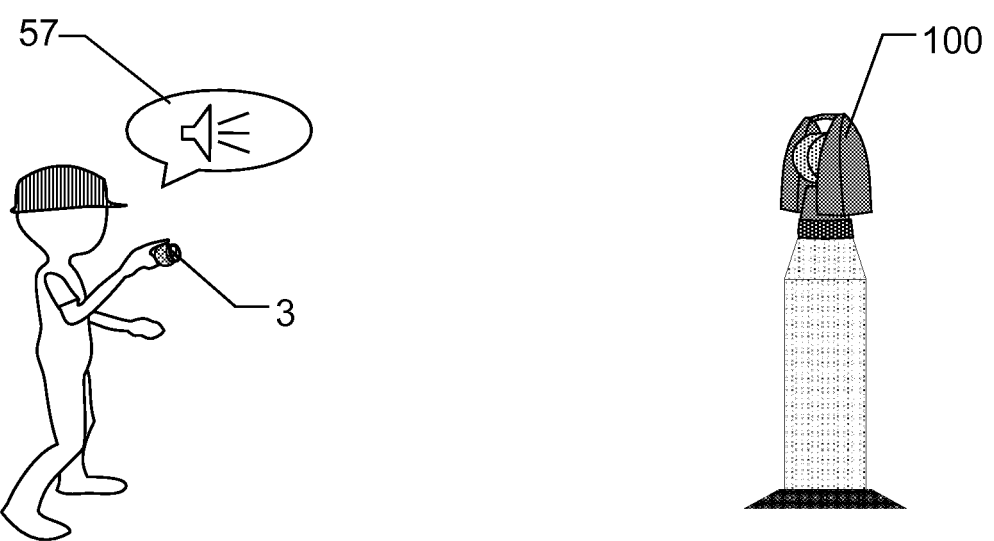
FIG. 12a,b: shows an embodiment of a laser tracker, configured to automatically adjust the alignment of the aiming axis towards a direction of origin of an acoustic identifier.
Figure 12B:
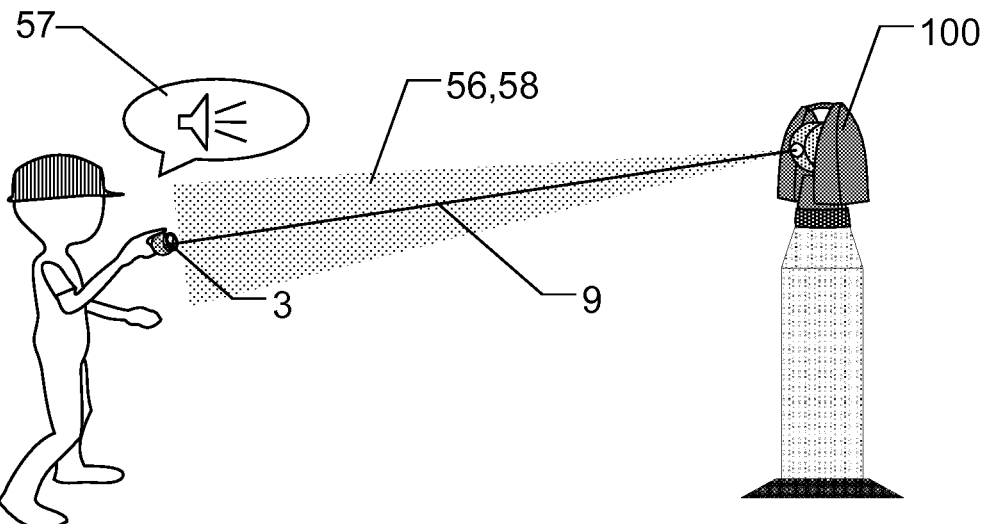

FIGS. 12a and 12b show an embodiment of an inventive coordinate measuring device, here a laser tracker 100, configured to automatically adjust the alignment of the aiming axis towards a direction of origin of an acoustic identifier signal.

By way of example, typical laser trackers often have a visual target localization functionality for automatically or at least semi-automatically lock a tracking beam 9 to a cooperative target 3. Sometimes this functionality is called "power-lock procedure", e.g. wherein the laser tracker 100 automatically scans a perimeter to find a cooperative target 3.

However, typical power-lock procedures have a quite narrow searching field of view 56 for localizing a cooperative target 3. Thus, either by moving the cooperative target 3 or by adjusting the orientation of a visual target localization unit associated with the power-lock functionality, at least a coarse pre-alignment of the cooperative target 3 and the target localization unit has to be carried out in order to bring the target 3 inside the searching field of view 56 of the visual target localization unit.

By way of example, the visual target localization unit may comprise a light source, particularly an LED, configured to radiate a search beam in the direction of the aiming axis, wherein a reflection of at least part of the search beam at the cooperative target is visible as a target point to a position detection sensor. Alternatively, or in addition, target localization may also be carried out by radio signal based localization, e.g. by using radio frequency telegram transceiver (RFTT) modules referenced to the coordinate measuring device and the cooperative target, respectively, e.g. wherein a first and a second RFTT anchor-module's position is referenced to the laser tracker and a RFTT tag-module is referenced to the cooperative target such that a rough location of the cooperative target is determined based on transmission of radio frequency telegrams between the RFTT anchor- and tag modules.

According to this embodiment of the invention, the laser tracker 100 comprises an acoustic localization unit, e.g. with at least two microphones for stereo-localization, configured to detect and identify an acoustic identifier signal 57. For example, the identifier signal 57 may be a pass phrase or pass word which is specific for a particular laser tracker 100 or a particular group of laser trackers, e.g. "hey laser tracker!" for generally addressing a laser tracker or "find me laser tracker five!" for specifically addressing the fifth laser tracker out of a group of laser trackers. Upon detection and identification of the pass phrase 57 the laser tracker 100 automatically determines the direction of origin of the pass phrase 57 and automatically adjusts the alignment of the aiming axis in order to align the aiming axis onto the determined direction of origin, i.e. providing a coarse alignment in order to bring the target 3 inside the searching field of view 56 of the visual target localization unit.

In addition, the laser tracker may be configured to generate a visible light cone 58 indicative of the field-of-view 56 of the visual target localization unit. Thus, in addition to the adjustment of the orientation of the visual target localization unit, the worker holding a cooperative target 3 may also manually adjust the position of the cooperative target 3 in order to bring it inside the visible light cone 58, e.g. in case the acoustic driven alignment is slightly off the cooperative target 3.

Figure 13:
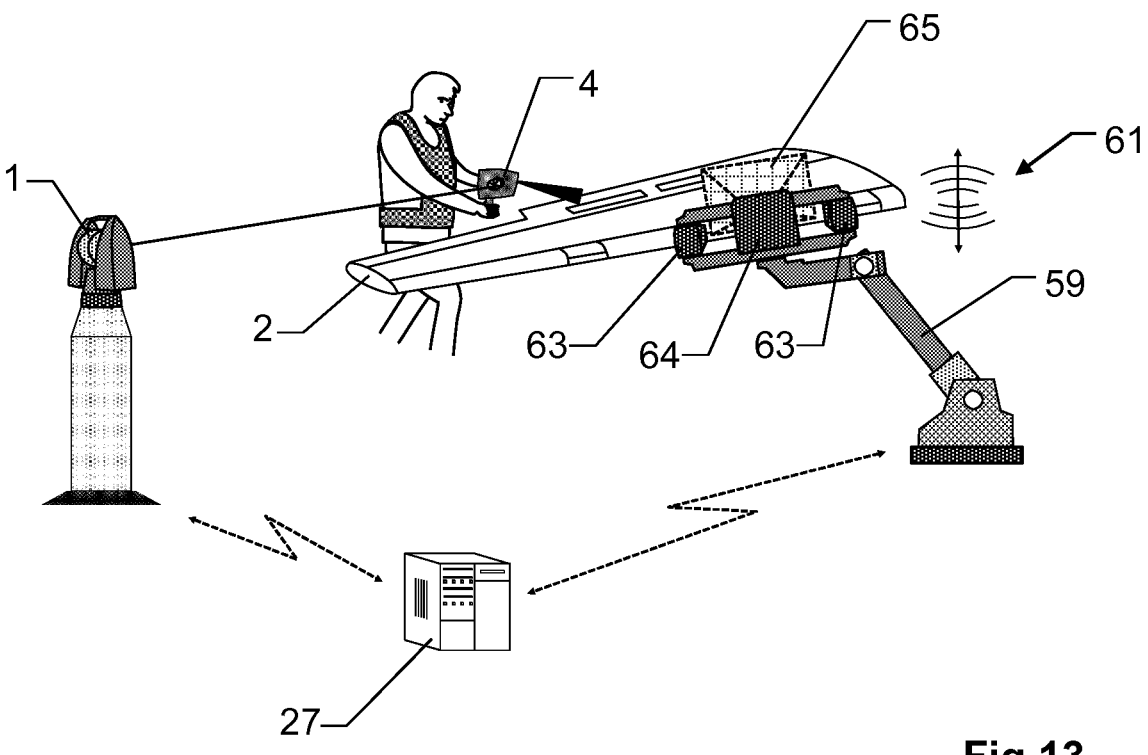
FIG. 13: shows another exemplary embodiment of a metrology system, comprising a laser tracker to determine the position of a movable accessory device and a referencing device to monitor residual movement of an object to be measured.

FIG. 13 shows an embodiment an inventive metrology system, wherein a movement of an object to be measured is taken into account in a positional measurement by a coordinate measurement device and a movable accessory device.

By way of example, the system comprises a laser tracker 1 to determine the position of a handheld scanner 4 configured to carry out a laser based measurement of an object to be measured 2. Based on the coordinate measuring data by the laser tracker 1 and the measurement by the movable accessory device, here the handheld scanner 4, a computing unit 27 determines positional data of the object to be measured 2, e.g. for comparison with specified manufacturing tolerances for that object 2, e.g. a comparison with CAD data of the object.

In addition, the system comprises a referencing device 59, configured to generate referencing data with respect to a reference point, wherein the referencing data are indicative of a distance change between the referencing device 59 and the reference point. For example, the reference point may be a point on the object to be measured 2, e.g. a cooperative target mounted on the object to be measured. Alternatively, the reference point may be arranged away from the object to be measured 2, while the referencing device 59 is arranged at the object to be measured, namely in such a way that a distance change between the referencing device 59 and the reference point is indicative of a movement of the object to be measured 2.

In other words, the referencing device 59, the reference point, and the object to be measured 2 are arranged with respect to each other that the referencing device 59 is able to pick up a movement of the object to be measured 2 in at least one degree of freedom, e.g. a vibration 61 of the object to be measured 2.

For example, the referencing device 59 is embodied as a stereo scanner with two cameras 63 arranged spaced apart from each other, and a projector 64 configured to project a pattern 65 of structured radiation onto the object 2, e.g. a fringe or Moiré projection pattern. The stereo scanner is configured to determine a 3D model of the object 2 based on a stereo-photogrammetric method and by making use of the pattern of structured radiation 65

Therefore, the computing unit 27 can be provided with the measuring data of the stereo scanner in order to compensate any movement of the object 2 when determining the positional data. By way of example, without having the referencing data, an inherent vibration of the object 2 or another unwanted movement of the object, e.g. caused by a shock when the worker accidentally hits the object 2, would have gone unnoticed in the measurement by the movable accessory device.

Alternative to the computing unit 27 being separate, it may also be part of the tracker determining the position of the movable accessory device or part of the referencing device 59.

Figure 14:
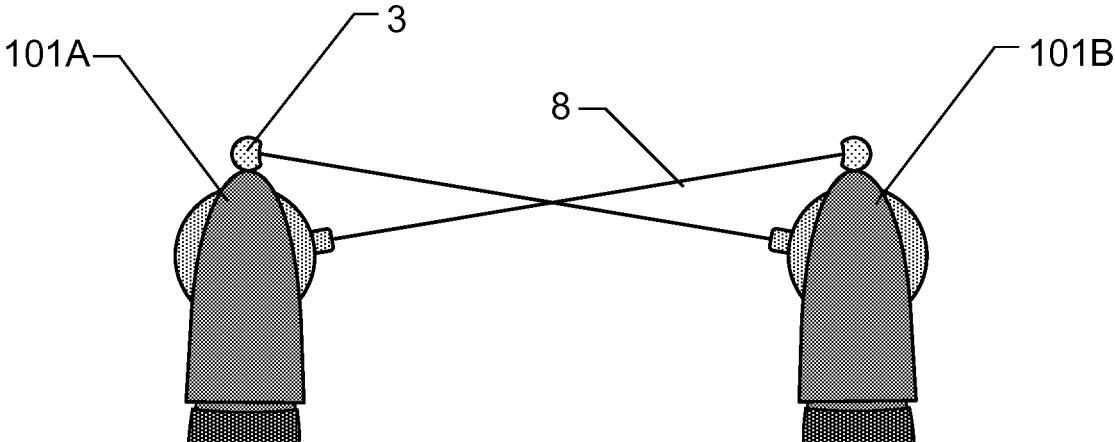
FIG. 14: shows two laser trackers embodied to be measurable by each other and thus providing self-calibration of the two laser trackers.
Figure 15:
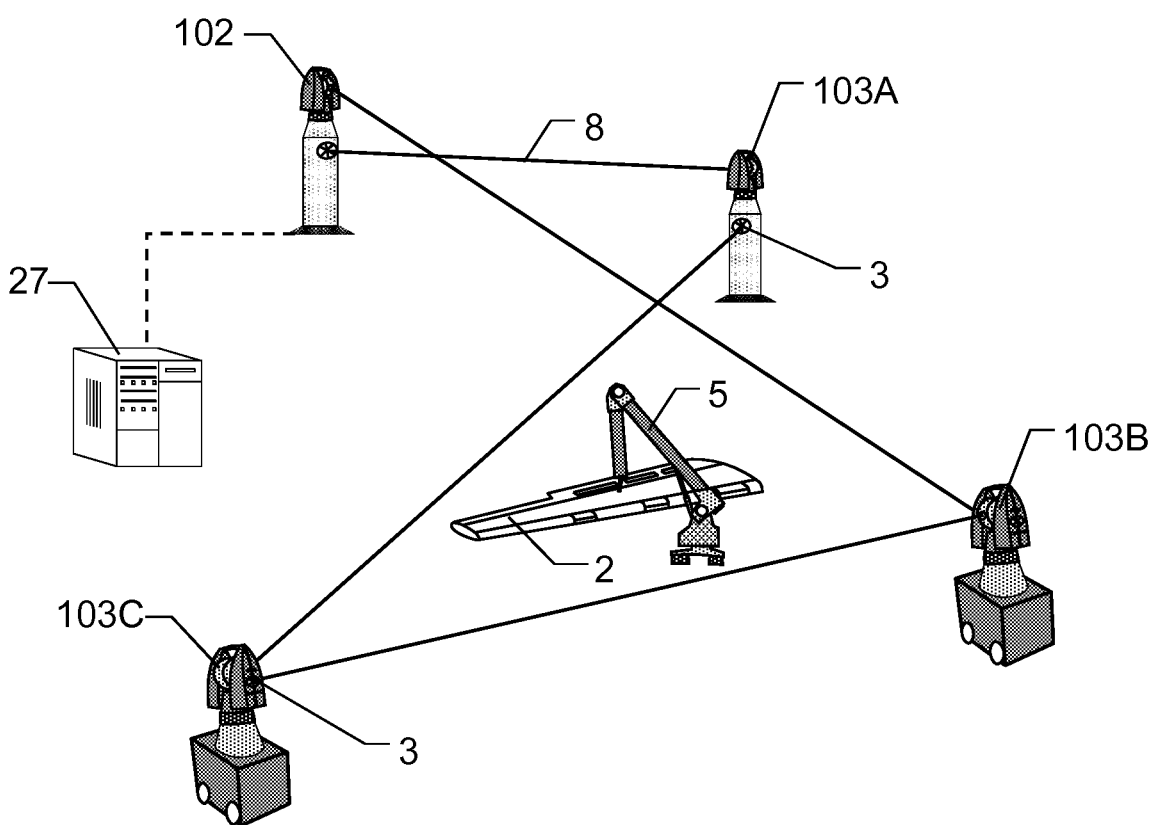
FIG. 15: shows a system with a plurality of laser trackers configured for self-calibration, wherein a group of laser trackers are referenced to a common coordinate system based on relative distance measurements between at least part of the plurality of laser trackers.

FIG. 14 and FIG. 15 relate to a system with a plurality of coordinate measurement devices, here in the form of laser trackers, configured for self-calibration, wherein each coordinate measuring device is configured to receive a measurement beam 8 of another coordinate measurement device such that coordinate measuring data of a group of coordinate measurement devices are referenced to a common coordinate system based on relative distance measurements between at least part of the plurality of coordinate measurement devices.

As schematically shown by FIG. 14, a first laser tracker 101A comprises a cooperative target 3, e.g. a reflecting unit with defined reflecting properties such as a steel sphere of known dimensions or a retro-reflecting unit such as a cubic prism, in order to be measurable by a second laser tracker 101B. Furthermore, also the second laser tracker 101B comprises a cooperative target 3, e.g. to be measured by the first laser tracker 101A or by another laser tracker of the plurality of laser trackers.

Each laser tracker of the system further has a target localization unit configured for localizing a cooperative target 3 within the perimeter of the respective laser tracker, e.g. a cooperative target of another laser tracker, and for deriving localization data configured to orient the tracker aiming axis towards the localized cooperative target 3.

Thus, by way of example, each laser tracker may be configured to automatically search its perimeter to localize one or a plurality of cooperative targets 3, and to automatically generate local coordinate measuring data with respect to one or more localized cooperative targets 3.

The local coordinate measuring data of different laser trackers 101A,101B may then be exchanged between laser trackers and/or provided to a central computing unit, enabling the system to reference the local coordinate measuring data of at least part of the plurality of laser trackers to a common coordinate system.

By way of example, in case of complex objects to be measured more than a single position of a laser tracker and/or a plurality of different laser trackers are needed. In order to combine the data acquisition of multiple positions of a single tracker or from multiple trackers an identical point-of-interest (POI), typically more than three POIs, is needed to be measured from all positions/by all trackers, in order to calculate a transformation between different local coordinate systems.

By way of another example, an automatic referencing to a common coordinate system may be carried out at an initialisation of the system, e.g. wherein all laser trackers of the system are referenced to each other.

In another example, a group of laser trackers may be defined to carry out a specific measuring task, wherein only the group of laser trackers is referenced to the common coordinate system. In particular, the system may be configured to monitor the group of laser trackers, in order to automatically detect a change or problem within the group upon which automatically a new referencing is carried out.

For example, in case a laser tracker has to be repaired and is thus replaced by another laser tracker, the added replacement tracker is automatically referenced to the group coordinate system, e.g. wherein the replacement tracker measures a set of reference points and/or wherein a set of laser trackers of the plurality of trackers determines relative distances between the set of laser trackers and the replacement tracker. Thus, the coordinate measuring data of the replacement laser tracker may be "integrated" into the common group coordinate system based on triangulation or multilateration principles.

FIG. 15 shows an embodiment wherein the referencing is made with respect to a reference position provided by the position of one particular laser tracker 102, hereafter referenced to as the referencing tracker, representing a fixed point in the common coordinate system. Three laser trackers 103A,103B,103C form a group of laser trackers foreseen to be used for measuring an object to be measured 2, e.g. in conjunction with a movable articulated arm robot 5.

In this example, the referencing tracker 102 and one of the group laser trackers 103A are embodied as fixed stations, i.e. having a fixed position within the metrology environment, wherein two of the group laser trackers 103B,103C are embodied as movable laser trackers, e.g. according to any embodiment of the inventive movable laser tracker. Furthermore, the referencing tracker 102 is connected to a computing unit 27 and configured to communicate with each of the group laser trackers 103A,103B,103C in order to forward coordinate measuring data of each of the group laser trackers to the computing unit 27.

By way of example, the referencing tracker 102 itself determines the position of one of the moveable group laser trackers 103B, which in turn determines positional data with respect to the other movable group laser tracker 103C, which in turn determines positional data with respect to the stationary group laser tracker 103A. In addition, the stationary group laser tracker 103A provides positional data with respect to the referencing tracker 102.

Therefore, the computing unit 27 is then able to reference the group laser trackers 103A,103B,103C with respect to each other based on the knowledge that the referencing tracker 102 is a fixed point in the common coordinate system.

It goes without saying that the system may make use of additional position determining means, e.g. inertial measuring units on the movable laser trackers 103B,103C or a GPS based positioning system, in order to resolve an ambiguity of an underdetermined system or for simplifying and/or speeding up the referencing. For example, instead of only determining a relative position, at least some of the plurality of laser trackers may be configured to additionally determine a pose, i.e. position and orientation, of another laser tracker.

Figure 16A:
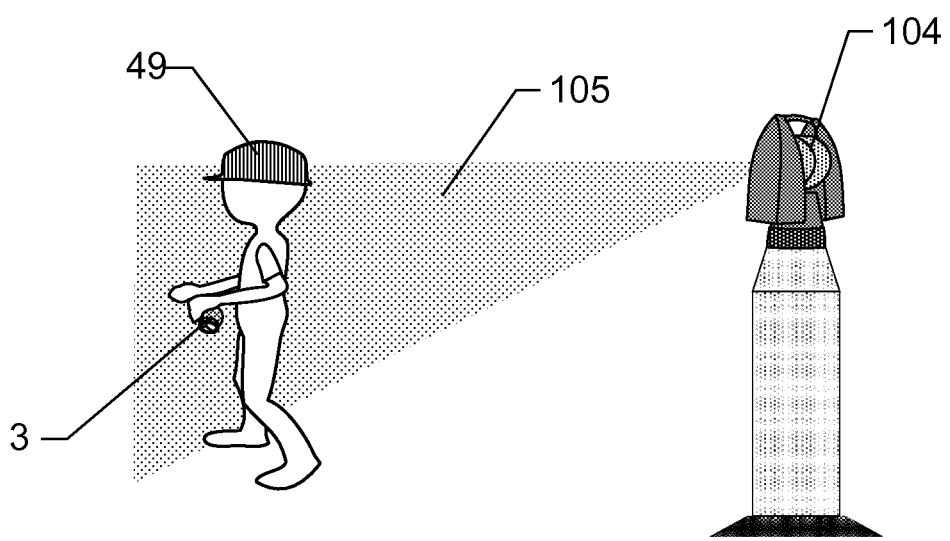
FIG. 16a,b: shows an embodiment of a laser tracker configured to provide video tracking of a person carrying a cooperative target.
Figure 16B:
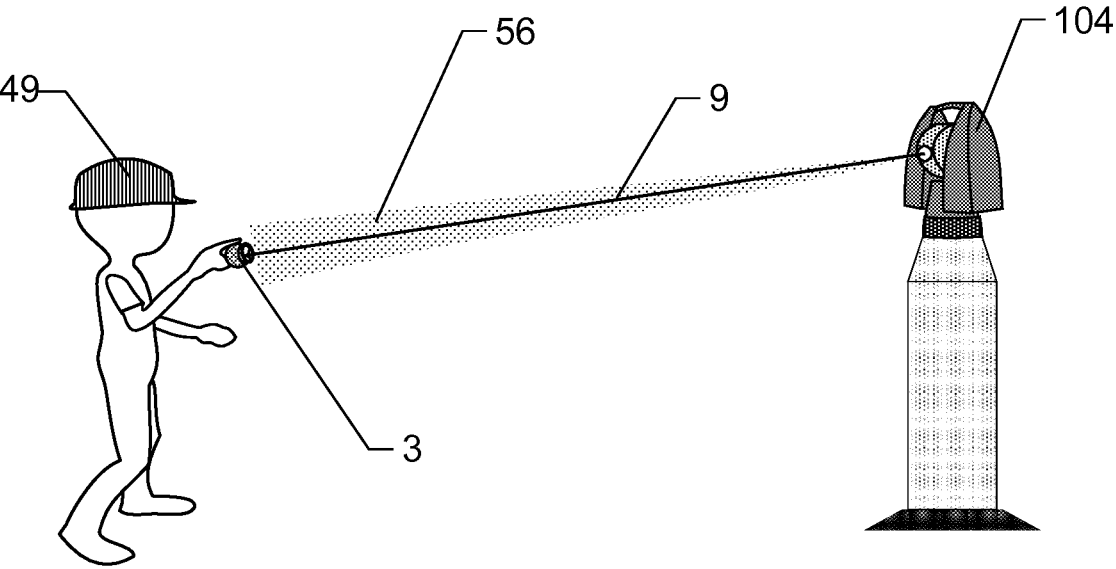

FIGS. 16a,b relate to an embodiment of a laser tracker configured to provide video tracking of a person carrying the cooperative target 3, e.g. wherein video tracking is used as auxiliary tracking mode in case the tracking beam 9 (FIG. 1) is blocked or when the worker stows the movable accessory device for repositioning.

By way of example, particularly in case of large objects to be measured, e.g. overhanging aircraft components in a production hall, a worker 49 carrying a movable accessory device having a cooperative target 3 may need to take different measurement positions, e.g. walk around the object to be measured. This may lead to some interruptions of a tracking beam 9, e.g. when the tracking beam is blocked by the worker itself when he is turning around.

In addition, many different workers may work on the same object to be measured. If two workers cross each other the tracking beam related to the worker in the background is blocked by the person in front. In such cases, the laser tracker may carry out a power-lock procedure to find a cooperative target and to automatically re-lock the tracking beam to a cooperative target. However, since typical power-lock procedures typically have a quite narrow searching field of view, it may happen that instead of re-locking the tracking beam onto the movable accessory device of the worker in the background the tracking beam is falsely locked onto the movable accessory device of the worker in front. In the extreme case, the laser tracker may not even notice this wrong re-lock and thus continue to track the wrong worker.

In many cases, the worker may also need to stow the accessory device for repositioning, e.g. to securely climb a ladder to reach the next scanning position. In this case, a camera may be used to track the position of the worker as a coarse position of the movable accessory device, e.g. by way of a computer vision algorithm to detect and track the worker in a video stream generated by the camera, in order to enable a quick re-lock of the tracking beam onto the cooperative target of the movable accessory device as soon as the worker has reached the next scanning position.

According to this embodiment of a laser tracker 104, the laser tracker 104 comprises a typical tracking unit configured to receive over a tracking channel a tracking signal, e.g. based on a tracking beam 9 (FIG. 1), which is indicative of a change in angular location of a cooperative target 3, wherein a change in angular location of the cooperative target 3 is determined based on the tracking signal and control data are generated for adjusting the alignment of the aiming axis, e.g. defined by the tracking beam 9, based on the determined change in angular location.

In addition, the laser tracker 104 has a second tracking unit comprising a camera configured to generate image data, wherein the second tracking unit is configured for video tracking of a target carrier, e.g. a housing or support structure of the cooperative target 3, or a machine or person 49 carrying the cooperative target 3.

The second tracking mode makes use of a recognizer—e.g. based on a computer vision algorithm to detect and track objects in a video stream—for determining a position of the target carrier, e.g. a worker 49, within an image of the image data generated by the camera. In particular, recognition indicia indicative of the appearance of the worker 49 imaged by the camera are determined by image processing, e.g. wherein the recognizer is configured to recognize the target carrier 49 based on pre-defined recognition information.

For example, the pre-defined information may be stored on a local computing unit of the laser tracker 104 and/or the laser tracker 104 may be configured for bi-directional communication with a remote computing unit having stored the pre-defined information. By way of example, such pre-defined information comprises at least one of recognition indicia for a type of the target carrier, e.g. particular shape of a machine type or a color of a worker's uniform; recognition indicia for a specific target carrier, e.g. an indicia enabling distinction between two machines or uniformed workers of the same type; an identification code of the target carrier designating a particular type; information indicative of the spatial arrangement of the cooperative target relative to the target carrier; and positional information for the target carrier, e.g. an absolute position of the target carrier provided by GPS or a radio frequency positioning system.

By way of another example, the laser tracker 104 is configured for training the recognizer for a particular target carrier 49 wherein recognition indicia indicative of the appearance of the target carrier 49 imaged by the image data are determined by image processing. For example, training may be based on image data generated in a locked state, wherein the tracking channel is undisturbed, namely such that the tracking signal is receivable without unscheduled interruption and the aiming axis is continuously adjusted based on the control data such that it is continuously following the cooperative target.

Therefore, the continuous lock onto the cooperative target makes the target carrier stay roughly at the same position in the images of the first image data, whereas the background and other untracked objects are moving. Thus, one can make use of this knowledge about the coarse position of the target carrier in the camera images as well as about its behavior when it is moving to learn the visual appearance of the imaged target carrier, e.g. from all sides of the carrier in case the carrier is moving and turning.

Furthermore, the laser tracker 104 has conventional visual target localization unit making use of a position detection sensor for localizing the cooperative target 3 within the field of view of the position detection sensor, and for deriving localization data configured to provide an alignment of the tracking beam 9, i.e. the aiming axis, of the conventional tracking unit with respect to the cooperative target 3.

In addition, the laser tracker 104 is configured to support the conventional visual target localization unit by video tracking in that the laser tracker 104 is configured to derive a motion parameter indicative of the target carrier 49 being in motion based on the image data of the second tracking unit. Thus, the visual target localization unit can be activated based on the motion parameter for providing the alignment of the aiming axis with respect to the cooperative target 3.

For example, the laser tracker 104 may automatically notice that the worker has reached the next scanning position because the worker now stands essentially still, upon which the laser tracker 104 automatically initiates a power-lock procedure to re-lock the tracking beam 9 onto the cooperative target 3. In particular, the laser tracker 104 may further be configured to take into account a position of the target carrier determined by the video tracking in combination with a known arrangement of the cooperative target 9 relative to the target carrier 49 in order to speed up the power-lock procedure by the visual target localization unit. By way of example, the laser tracker 104 is configured for video tracking of a human worker and to expect the cooperative target 9 approximately at chest height as soon as the worker stands still.

Thus, as depicted by FIG. 16*a*, a worker 49 who may need to reposition, e.g. requiring a stowing of the cooperative target 3 to securely reach the next position, addresses the laser tracker 104 to follow the worker by video tracking 105, wherein during video tracking the worker 49 does not have to pay attention anymore, that the cooperative target 3 is captured by a tracking beam 9.

As soon as he reaches the next measuring position, the laser tracker 104 recognizes that the worker 49 stands still and automatically starts a power-lock procedure based on knowledge of the worker position determined by video tracking and based on knowledge of an expected position of the cooperative target 9, here at chest height of the worker 49. Therefore, despite the narrow search field of view 56 of the visual target localization unit the laser tracker 104 is able to quickly find the cooperative target 9 in order to re-lock the tracking beam 9 onto the cooperative target 9.

Figure 17:
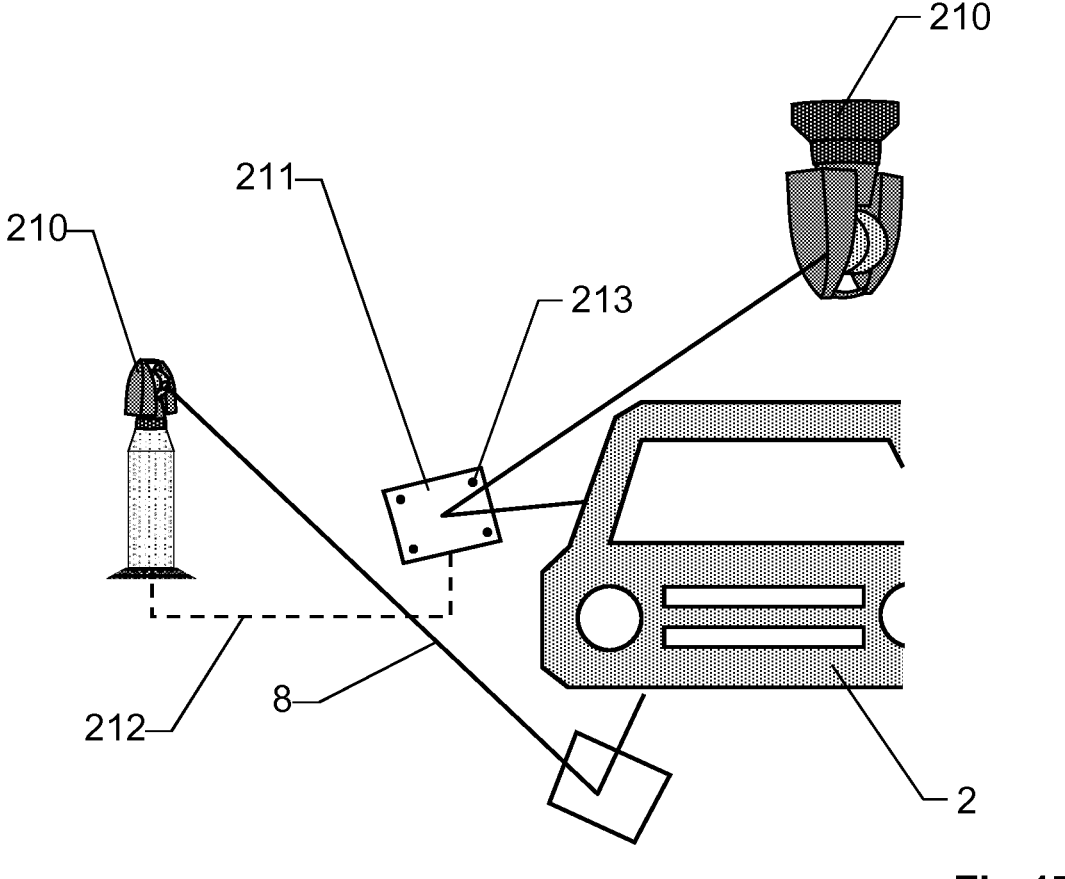
FIG. 17: shows an embodiment of the metrology system, wherein a deflecting unit is used to avoid a blind spot of a laser based coordinate measuring device.

FIG. 17 schematically depicts an embodiment, configured to use a deflecting unit to avoid a blind spot for measuring an object, e.g. due to a separate interfering object or due to the object itself interfering with the laser measurement beam 8 of a laser based coordinate measuring device, here exemplarily embodied as a laser tracker with scanning functionality 210.

Here, the smart factory comprises one or multiple deflecting units 211, e.g. comprising a movable mirror, separate from the coordinate measuring device 210. In the example shown, the coordinate measuring device 210 and the deflecting unit 211 are arranged in a fixed positional relationship with respect to each other, wherein the relative position of the coordinate measuring device 210 and the deflecting unit 211 with respect to each other, the movement direction of the laser beam 8 with respect to the coordinate measuring device 210, and the orientation of the movable mirror of the deflecting unit 211 is known by the system. Therefore, the system is configured to generate scanning data providing coordinates of measurement points based on the known relative positions and orientations, the coordinate measuring data provided by the coordinate measuring device, and control data indicating the orientation of the deflecting unit 210.

By way of example, when using the deflecting unit 211, the laser measurement beam 8 is directed onto the deflecting unit 211 and then kept fixed, e.g. at the so-called "geometric mirror centre", so that the directional parameters defining the overall targeting by the laser measurement beam 8 are only dependent on deflection settings of the deflecting unit 211.

For example, the mirror 211 is mounted at a two-axis motorized rotation device (not shown) such that it can make fast and precise movements based on control commands from the coordinate measuring device 210. The precise mirror orientation may be detected by high-resolution angular encoders, e.g. wherein the encoders have a defined zero-position. The deflecting unit 211 may have a CPU included which can send and receive commands, e.g. wherein the deflecting unit 211 and the coordinate measuring device 210 are connected by an EtherCat real-time interface 212.

In the embodiment depicted by the figure, coordinate measurement is based on a so-called "stable beam pointing", wherein the laser measurement beam 8 is kept fixed at a fixed point with respect to the two rotation axes (so-called "geometric mirror centre"). At this mode all beam movements are done by the deflecting unit 211 only, here by setting different orientation of the movable mirror.

For example, the deflecting unit 211 and the coordinate measuring device 210 are configured and communicate with each other, such that the mirror 211 provides for generally known functionalities of the coordinate measuring device 210, for example an automatic target recognition functionality, e.g. wherein find reflector commands are established via mirror sensor movements, a power-lock functionality wherein the reflector is locked on via mirror movements, or a tracking functionality for tracking of the reflector by the mirror movement only, e.g. wherein movement commands based on a position sensitive detector of the coordinate measuring device are sent to the deflecting unit via a real-time interface. Furthermore, by providing a sufficient mirror diameter the mirror 211 and the coordinate measuring device 210 may interact with each other to provide typical 6DoF-functionalities of the coordinate measuring device, e.g. wherein a laser tracker has a 6DoF-camera for detecting and analysing markings on a 6DoF measurement probe via the image of the 6DoF measurement probe seen via the mirror.

For example, the mirror 211 may further comprise a configuration of orientation markings (not shown), e.g. a set of at least three LEDs, the configuration of orientation markings being mounted and arranged such that the orientation markings are co-moving with the mirror. Therefore, the coordinate measuring device 210 is configured to determine the mirror orientation by acquiring and analysing an image, which comprises at least part of the configuration of orientation markings. The determined mirror orientation can then be used to provide the control data indicating the orientation of the deflecting unit 210 in order to derive the 6DoF orientation of the measurement probe, i.e. by further analysing the image of the 6DoF measurement probe seen via the mirror.

By way of another example, the mirror 211 may be rotated to become an autocollimation mirror for detecting the coordinate of the mirror position. In particular, the mirror 211 has a set of reference markings 213, particularly at least three, arranged in a fixed relationship such that the geometric centre of the mirror can be detected, e.g. by means of image analysis of an image of the mirror captured by the coordinate measuring device 210.

In particular, the smart factory may comprise a plurality of deflecting units, wherein the system is configured that different coordinate measuring devices may interact (not at the same time) with the same deflecting unit, that one coordinate measuring device may interact with multiple deflecting units, or that the coordinate measuring device may only interact with a dedicated deflecting unit assigned to that coordinate measuring device.

Figure 18:
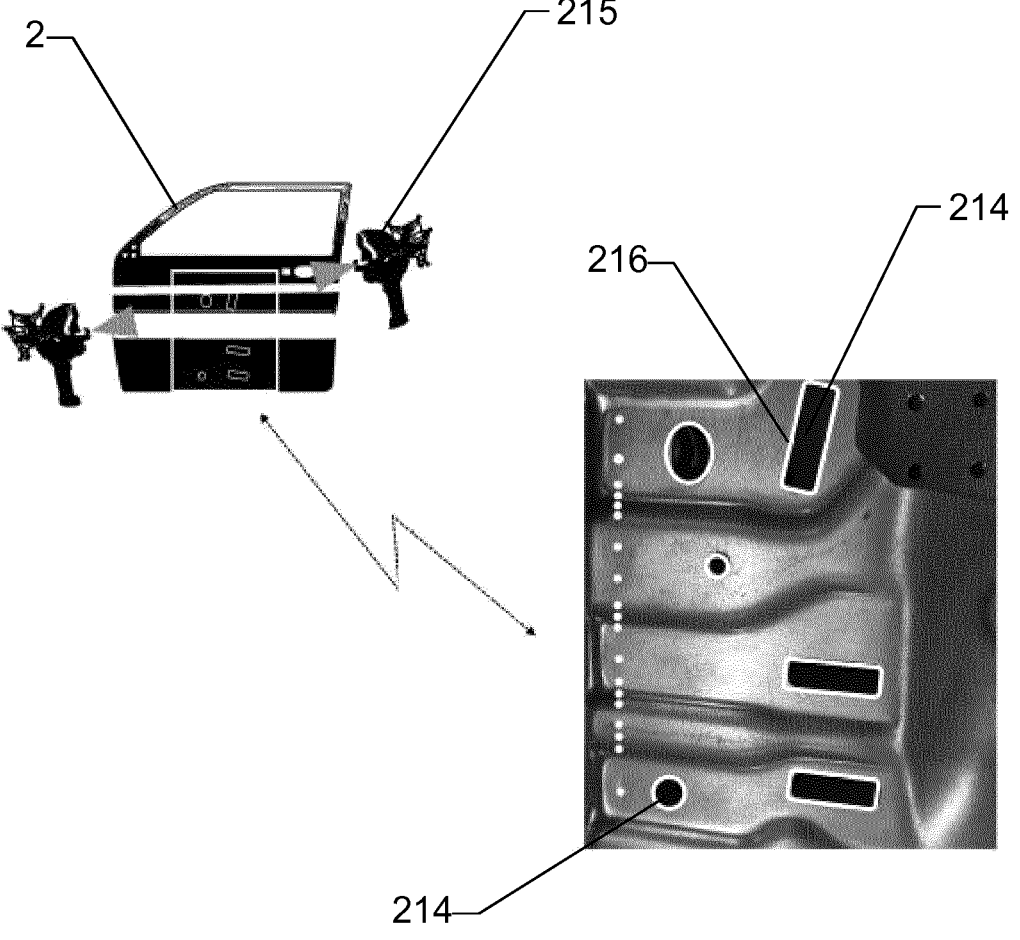
FIG. 18: shows an embodiment of the metrology system, wherein image based segmentation is used to identify features of interest to be scanned by a scanning device and to automatically provide a setting parameter of the scanning device for scanning the features of interest.

FIG. 18 schematically depicts an embodiment of the metrology system, wherein image based segmentation is used to identify features of interest 214 to be scanned by a scanning device 215 and to automatically provide a setting parameter of the scanning device 215 for scanning the features of interest 214. The left part of the figure shows as an exemplary application of the embodiment a test measurement in vehicle production, wherein the right part shows a zoomed in view of an image taken of the test part taken by a camera.

For example, the scanning device is a handheld scanning device as described above, wherein an image of the object to be measured 2 is provided by a conventional camera (not shown). Thus, the system may make use of fast feature detection by a segmentation algorithm known in the prior art, e.g. to detect edges, planar surfaces, textures, and/or different colors of the object 2.

By way of example, the provided setting parameter may indicate perimeter boundaries 216 for scanning the features, which may be essentially instantly visualized in an image of the object. More particularly, the system may comprise a projector, configured for directly projecting the boundaries 216 onto the object. Furthermore, based on the identified features of interest 214, best scan settings for the scanning device 215, e.g. defining optimal resolution conditions for scanning the feature may be automatically pre-set so that the operator of the scanning device 215 can essentially instantly start scanning the features.

By way of another example, the scanning device 215 may be part of an automated system configured to automatically measure a test object, e.g. wherein the scanning device is mounted on a robot arm. The system may then be configured to use the provided setting parameter to automatically pre-set the scanning device and to take into account the setting parameter, e.g. providing perimeter boundaries referenceable to a local coordinate system of the robot arm, for controlling the robot arm to automatically scan the test object.

Although the invention is illustrated above, partly with reference to some preferred embodiments, it must be understood that numerous modifications and combinations of different features of the embodiments can be made. All of these modifications lie within the scope of the appended claims.

What is claimed is:

1. A metrology system comprising:
a laser tracker having:
an opto-electronic distance meter configured to emit a distance measurement beam towards a cooperative target of a moveable accessory device in the direction of an aiming axis, and to provide distance measurement data based on at least a part of the distance measurement beam returning from the cooperative target, wherein the cooperative target is configured to cooperate with a tracking unit of the laser tracker to generate a tracking signal,
an angle determining unit configured to provide angle determination data for determining the pointing direction of the aiming axis, and
the tracking unit configured
to receive over a tracking channel the tracking signal which is indicative of a change in angular location of the cooperative target, to determine the change in angular location of the cooperative target based on the tracking signal, and
to generate control data for adjusting an alignment of the aiming axis based on the determined change in angular location,
the movable accessory device, configured for scanning or probing of an object, and
a computing unit configured to generate coordinate measuring data for the object by using the distance measuring data and the angle determination data to determine a position of the movable accessory device, and by using the determined position of the movable accessory device for referencing the scanning and/or probing by means of the movable accessory device to a coordinate system relative to the laser tracker, and
a referencing unit configured to determine a positional change between the referencing unit and a reference point on the object to detect a movement of the object in at least one degree of freedom, wherein:
the referencing unit is provided by the laser tracker or by a separate device which is different from the movable accessory device, wherein the separate device and the laser tracker are configured such that the referencing data are referenceable to the coordinate measuring data,
the positional change is determined by referencing data generated by the referencing unit independently from the opto-electronic distance meter, the reference point is embodied by a cooperative target mounted on the object or defined by a reference surface of the object, and
the computing unit is configured to take into account the referencing data to generate the coordinate measuring data.

2. The system according to claim 1, wherein the referencing unit is embodied as a camera unit being configured to generate 3D data of the object based on imaging data.

3. The system according to claim 2, wherein the camera unit comprises
a projector configured to project a pattern of structured radiation onto the object, and
a processor configured to determine a 3D model of the object based on a photogrammetric method and by making use of the pattern of structured radiation.

4. The system according to claim 1, wherein the referencing unit is configured to detect a vibration of the object.

5. The system according to claim 1, wherein the referencing unit is configured to detect at least one of a change in roll, a change in pitch, and a change in yaw angle of the object.

6. The system according to claim 1, wherein the computing unit is configured to generate the coordinate measuring data by at least one of
compensating a movement of the object determined based on the referencing data,
ignoring distance measuring data of the opto-electronic distance meter and/or angle determination data of the angle determining unit in case a relative positional change between the object and the referencing unit exceeds an allowed threshold, and
flagging the coordinate measuring data in case a relative positional change between the object and the referencing unit exceeds a threshold defined for ensuring a desired measurement accuracy of the coordinate measuring data.

7. The system according to claim 1, wherein the movable accessory device is at least one of a probing or scanning device configured to approach the object and to carry out at least one of a tactile, a laser based, and a camera based coordinate measurement, particularly embodied as a range imaging camera, a stereo-imaging camera, an articulated arm robot, or a white light sensor, a marking device configured to mark the object, a tool and/or manufacturing instrument, and another laser tracker.

8. The system according to claim 1, wherein the referencing unit configured and arranged that the referencing data are referenceable to the coordinate measuring data.

9. The system according to claim 1, wherein the tracking unit comprises a tracking sensor and is configured to generate a tracking beam and to receive the tracking signal based on the tracking beam returning from the cooperative target, by determining a deviation from a zero position on the tracking sensor.

\* \* \* \* \*